US006927682B1

(12) United States Patent
Touhey et al.

(10) Patent No.: US 6,927,682 B1
(45) Date of Patent: Aug. 9, 2005

(54) DIGITAL VEHICLE SERVICE INDICATOR

(76) Inventors: Jeff Touhey, 905 SE. 96th Ave., Vancouver, WA (US) 98664; Kathy R Clark, 13801 NW. 10th Ct., #B-10, Vancouver, WA (US) 98685

(*) Notice: Subject to any disclaimer, the term of this patent is extended or adjusted under 35 U.S.C. 154(b) by 109 days.

(21) Appl. No.: 10/325,785

(22) Filed: Dec. 21, 2002

(51) Int. Cl.[7] .................................. B60Q 1/00
(52) U.S. Cl. ................. 340/457.4; 701/29; 701/30
(58) Field of Search ............... 248/607, 223.31, 248/279.1, 295.11, 307; 224/281; 362/489; 340/457.4

(56) References Cited

U.S. PATENT DOCUMENTS

| | | | |
|---|---|---|---|
| 3,903,736 A | 9/1975 | Bissett et al. | |
| 3,925,754 A | 12/1975 | Ota et al. | |
| 3,940,735 A | 2/1976 | Kronenberg | |
| 3,972,022 A | 7/1976 | Goto et al. | |
| 4,031,363 A | 6/1977 | Freeman et al. | |
| 4,084,262 A | 4/1978 | Lloyd et al. | |
| 4,129,037 A | 12/1978 | Toalson | |
| 4,159,531 A | 6/1979 | McGrath | |
| 4,525,782 A | 6/1985 | Wohlfarth et al. | |
| 4,551,703 A | 11/1985 | Bourauel et al. | |
| 4,796,204 A | 1/1989 | Inoue | |
| 4,884,054 A * | 11/1989 | Moon, Sr. ................. | 340/457.4 |
| 5,541,858 A * | 7/1996 | Warner ...................... | 702/165 |
| 5,705,977 A * | 1/1998 | Jones ...................... | 340/457.2 |
| 5,819,201 A * | 10/1998 | DeGraaf ..................... | 701/208 |
| 6,131,060 A * | 10/2000 | Obradovich et al. ......... | 701/49 |
| 6,301,947 B1 | 10/2001 | McCombs, Jr. | |
| 6,464,185 B1 * | 10/2002 | Minelli et al. ........... | 248/183.1 |
| 6,594,579 B1 * | 7/2003 | Lowrey et al. ............ | 701/123 |
| 6,636,790 B1 * | 10/2003 | Lightner et al. ............ | 701/33 |
| 2003/0109972 A1 * | 6/2003 | Tak ............................ | 701/29 |
| 2003/0225511 A1 * | 12/2003 | Kushida et al. ............ | 701/208 |

* cited by examiner

Primary Examiner—Thomas J. Mullen, Jr.
Assistant Examiner—Samuel J. Walk
(74) Attorney, Agent, or Firm—Michael I. Kroll

(57) ABSTRACT

A vehicle service indicator releasable secured within a vehicle. The vehicle service indicator includes a microprocessor able to monitor a distance traveled by the vehicle. A service task indicator is controlled by the microprocessor and includes a display indicating a desired function to be monitored. A step down odometer is connected to the microprocessor. The step down odometer includes a display for displaying a numeric value indicative of a distance to be traveled by the vehicle before the function displayed by the programmed service indicator is to be performed. An indicator is provided for producing an alarm signal. The microprocessor decreases the value displayed by the step down odometer relative to the monitored distance traveled by the vehicle. When the value displayed by the step down odometer reaching a value of "0" the microprocessor activates the indicator to produce an alarm signal alerting a user of the vehicle that the function displayed by the programmed service indicator should be performed. The indicator may include a plurality of programmed service task indicators, a plurality of step down odometers and a plurality of indicators for monitoring a plurality of functions for the vehicle. The vehicle service indicator may be integrally connected or releasably connected within the vehicle. The microprocessor may be programmed by a user to display the desired function to be monitored as well as to count down a desired distance by the odometer.

9 Claims, 21 Drawing Sheets

DIGITAL VEHICLE SERVICE INDICATOR

BACKGROUND OF THE INVENTION

1. Field of the Invention

The present invention relates generally to vehicle service indicators and, more specifically, to a digital vehicle service indicator programmable by the user to inform the user of how many miles may a vehicle travel before scheduled service tasks such as oil changes, transmission tune-ups, fuel filter changes, tire rotations etc. are due through the use of one or more reverse odometers that display the predetermined mileage countdown next to the name of the appointed task.

2. Description of the Prior Art

There are other vehicles service indicator devices. Typical of these is U.S. Pat. No. 3,903,736 issued to Bissett et al. on Sep. 9, 1975. Another patent was issued to Ota et al. on Dec. 9, 1975 as U.S. Pat. No. 3,925,754. Yet another U.S. Pat. No. 3,940,735 was issued to Kronenberg on Feb. 24, 1976 and still yet another was issued on Jul. 27, 1976 to Goto et al. as U.S. Pat. No. 3,972,022.

A further patent was issued to Freeman et al. on Jun. 21, 1977 as U.S. Pat. No. 4,031,363. Yet another U.S. Pat. No. 4,084,262 was issued to Lloyd et al. on Apr. 11, 1978. Another was issued to Toalson on Dec. 12, 1978 as U.S. Pat. No. 4,129,037 and still yet another was issued on Jun. 26, 1979 to McGrath as U.S. Pat. No. 4,159,531.

Still another patent was issued to Wohlfarth on Jun. 25, 1985 as U.S. Pat. No. 4,525,782. Yet another U.S. Pat. No. 4,551,703 was issued to Bourauel et al. on Nov. 5, 1985. Another was issued to Inoue on Jan. 3, 1989 as U.S. Pat. No. 4,796,204 and still yet another was issued on Oct. 16, 2001 to McCombs, Jr. as U.S. Pat. No. 6,301,947.

While these vehicle service indicator devices may be suitable for the purposes for which they were designed, they would not be as suitable for the purposes of the present invention, as hereinafter described.

The present invention is directed to an apparatus for monitoring the wear on an engine and wherein the wear on the article is related to a particular function such as engine rotations. The present invention includes means for producing an output signal having characteristics in accordance with the particular wear function and for applying this output signal through an electrolytic storage cell for transferring particular amounts of an active material between electrodes in the electrolytic storage cell so as to store information in accordance with the output signal. The present invention also includes the use of more than one input to the electrolytic storage member.

There is provided a mileage warning system designed so that when the distance traveled by an automotive vehicle reaches a predetermined value, the driver is warned by a warning device, e.g., a lamp to perform the periodic checks, periodic replacement of parts or the like each time a predetermined distance has been traveled.

Device for indicating when a vehicle has traveled a predetermined distance, calling for inspection or servicing of some part of the vehicle. An electrochemical indicator integrates a signal indicative of the vehicle speed to provide an output indication.

An indicator of vehicle service intervals for use in a vehicle comprising a transducer for transducing the revolution of the transmission output shaft of the vehicle into an electrical signal, an electrolytic integrating element electrolytically corroded by the output signal of the transducer, and a display unit for giving visible and audible alarms in response to the circuit cut-off action of the time limit element. In the system, successive pulses representing the distance traveled by the vehicle are integrated to cause progressive electrolytic corrosion of the electrolytic integrating element, and the alarm is displayed when the total traveled distance attains a predetermined value.

Apparatus capable normally of presentation of time in hours and minutes and upon command of other functions, such as miles before service is required and days before service is required. The apparatus includes at least one logic integrated circuit for providing required frequency division of various inputs, a storage for accumulating information received from the integrated circuit and for retaining the information over a period of time even though power to the circuit is interrupted, a power supply and a display for displaying information on demand.

A digital monitor for monitoring the operation of a synchronous digital system. Proper operation of the monitored digital system is determined by storing a predetermined sequence of digital numbers in a memory. The bit patterns generated by the system being monitored are utilized as addresses to read the stored digital numbers. After each read cycle the digital number read from the memory is examined to determine if it has the proper value. If the value is not proper, a memory is set indicating that the system being monitored has malfunctioned. Additionally, the number of bit patterns checked during each cycle of the system is determined. If the correct number of patterns are not checked, the memory is also set indicating that a malfunction has occurred. Apparatus for monitoring a selected number of analog signals such as power supply voltages is also provided. Either of these tests may be inhibited by signals from the system being monitored or by signals from an external source.

Method and apparatus for measurement of expected wear on a wide range of mechanisms that are subjected to a plurality of wear inducing factors. Where detection of wear is desired for certain components of oilwell drilling fluid piston pumps the method may be accomplished by recording a function of the product of piston speed, pump generated fluid pressure and time. Means are provided for monitoring signals representing pump pressure and speed or cycles, multiplying these signal quantities and obtaining a product which is a function of hydraulic horsepower hours. This product is then scaled to a convenient degree, and totalized. The invention is applicable to many types of mechanical and electromechanical devices including centrifugal and positive displacement pumps, compressors, and to various types of engines and motors. The invention provides a means to record the work output for any machine wherein it is possible to obtain electrical analog signals representing speed or cycles and torque or pressure.

A solid state unit is provided which is intended as an aid in the maintenance and upkeep of a motor vehicle, and which serves as a reminder of the next maintenance mileage point, and the items to be serviced at the next maintenance operation. The unit also serves as a permanent record of the scheduled maintenance that has been performed on the vehicle throughout its lifetime. The unit is intended to be mounted under the dashboard, or at any other convenient location within the vehicle. The unit includes a programmable read-only memory (PROM) in which data is permanently stored representing the mileage at which the next maintenance operations are to be performed, as well as data identifying the items requiring servicing at the next maintenance point. The unit also includes an appropriate display, and solid state logic circuitry which, when activated, causes the mileage at which the next scheduled maintenance is to be performed, as well as the items to be serviced at the next scheduled maintenance point, to be displayed. In addition, the unit may be conditioned to display the last maintenance mileage point, and the items actually serviced at the last maintenance operation. In a preferred embodiment of the invention, the memory also stores as a permanent record data relating to all previous actually performed maintenance operations, and the mileage points at which such operations were performed. In addition, data relating to the identity of the dealer who serviced the vehicle at each maintenance point may be stored in the memory; as well as data relating to the original dealer, the make, model and year, and the serial number of the vehicle.

A process and apparatus for determining maintenance and servicing intervals on motor vehicles which makes it possible to vehiclery out maintenance or servicing work as a function of the states of wear of the operating parameters to be maintained, wherein values corresponding to the particular states of wear of the operating parameters are fed to a computing unit, and by comparison with values filed in its store the computing unit displays a recommendation to vehiclery out the maintenance work when an operating parameter has approached or reached the wear limit. The motor vehicle driver can thus see which driving behavior to adopt in order to achieve as long a maintenance interval as possible, so that he has an incentive to drive economically. Practice of the invention assures that parts are exchanged or renewed only when this is actually necessary.

The signaling device provides a signal indicating the need for a maintenance service when a limit value of a given magnitude is reached. This magnitude is a function of the total number of revolutions of an output shaft or any other rotary part and optionally of one or a plurality of additional operation parameters.

Herein disclosed in an oil degradation warning system which comprises several sensors for sensing parameters which are closely related to degradation factors of the engine oil, a microcomputer which processes the detected parameters to compute oil degradation coefficients of them in each factor, integrates the oil degradation coefficients in each factor with passage of time, and issues an instruction signal when at least of the integrated values of the oil degradation coefficients exceeds a corresponding reference value, and a warning device which gives a warning when the instruction signal is applied thereto.

A fluid level indicator that compensates for fluid temperature is provided. The indicator includes an elongated shaft that is received by the fill tube of the apparatus. The shaft is adapted to contact the fluid at one end to measure the level of fluid in the apparatus. A reversible liquid crystal display is vehicleried by the shaft and includes a plurality of bands. Each band has a defined height and is capable of being illuminated when the oil is within a certain temperature spectrum. When the band is at a temperature within its spectrum, the band illuminates, or somehow differentiates itself from those bands that are not within their illumination spectrum. At a specific temperature, certain bands, adjacent to one another, are illuminated to create a vertical range on the dipstick. The desired level of fluid in the apparatus is defined by the vertical range created by the illuminated bands of the liquid crystal display.

SUMMARY OF THE PRESENT INVENTION

The present invention relates generally to vehicle service indicators and, more specifically, to a digital vehicle service indicator programmable by the user to inform the user of how many miles may a vehicle travel before scheduled service tasks such as oil changes, transmission tune-ups, fuel filter changes, tire rotations etc. are due through the use of one or more reverse odometers that display the predetermined mileage countdown next to the name of the appointed task.

A primary object of the present invention is to provide a digital service indicator unit for vehicles having a digital display unit with one or more step down odometers for informing the user of how many miles may be traveled before having traveled a preselected distance at which point a respective service task is due to be performed.

Another object of the present invention is to provide a digital vehicle service indicator unit able to determine the number of miles traveled via communicating with an Engine Control Unit (ECU) or odometer of the vehicle through a remote transmitter that transmits relevant data to the digital display unit.

A further object of the present invention is to provide a digital vehicle service indicator unit wherein the digital display unit is detachably mounted to the interior of the windshield by means of a slider retainer bracket that is adhesively affixed to the windshield.

Yet another object of the present invention is to provide a digital vehicle service indicator unit for vehicles having programmable alerts and reminders that could include text messages in the digital display, audible alarms, LED's, any other appropriate warning means or any combination thereof.

Still yet another object of the present invention is to provide a digital vehicle service indicator unit wherein data from the ECU could realize immediate emergency conditions and back-up the indicator systems of the vehicle by using text, lights, audible alarms or any combination thereof to alert the driver to conditions such as low oil pressure, high engine temperature and the like.

Another object of the present invention is to provide a digital vehicle service indicator unit that is economical in cost to manufacture and operate.

Yet another object of the present invention is to provide a digital vehicle service indicator unit that is simple and easy to use.

Additional objects of the present invention will appear as the description proceeds.

A remote, wireless transmitter communicates with the odometer on older vehicles or with the engine control unit (ECU) on newer vehicles and transmits the mileage data collected therefrom to the digital display unit located on the interior of the vehicle.

Performing regular maintenance on vehicles has been shown to significantly extend the long term reliability thereof but most people lose track of when different maintenance tasks such as oil changes were last fulfilled or they don't even think about a transmission tune-up until problems such as slippage start to occur which could easily be avoided in a cost effective manner if scheduled maintenance is kept up to date. The present invention provides a digital display unit that displays one or more service priorities and the mileage remaining until each service is due. Some of the services could include, but are not limited to oil changes, transmission tune-ups, replacing the fuel filter, rotating the tires, etc. The desired service tasks to be monitored are programmed into the digital display unit as is the appropriate mileage according to how frequently the service is required such as 3000 mile intervals between oil changes although others may prefer to schedule them more frequently. Once the digital display unit is programmed accordingly it is slidably inserted into a slider retainer bracket that is adhesively secured to an unobtrusive interior portion of the windshield.

The programming of the vehicle service indicator unit is comparable to selecting and presetting ones' favorite radio stations on a common digital AM/FM vehicle radio. The programming of the vehicle service indicator unit is achieved by the soft touch of a fingertip. The user presses functional buttons to identify type of service, date or mileage the service is to be performed and then presses a set button to program the service data into memory. The user can program and set multiple service tasks into memory.

Optionally on new vehicles, the service indicator unit can be programmed with preset values at the factory, the preset values being model specific vehicle information regarding recommended service changes. For example, the 2002 Ford Escape includes a PVC valve service task that is recommended every 40,000 miles. This service may be preprogrammed at the factory into the service indicator unit to alert the user or driver when the appropriate time for service arrives. Factory set tasks would illuminate a light or emit sound to indicate when service is near or due in a manner similar to user programmed tasks.

As the vehicle operates, the remote transmitter acquires data from the ECU of the vehicle and transmits the data to the digital display unit. A microprocessor in the unit translates the standardized communication protocol (usually SAE J1850) which enables all the different electronics modules in the vehicle to communicate with each other. The microprocessor then takes the pertinent odometer data and uses it to step down the reverse odometers of the unit accordingly.

Optional features also include audible and visual alarms and reminders that could be set at various intervals. For example, an audible alarm and an LED may be programmed to be activated every 100 miles measured once the vehicle is within 1000 miles of a required service and every 10 miles once the respective odometer of the unit reaches the 0000 mark. Since the present invention is already in communication with the ECU and capable of translating the standardized communication protocol, the device may also be programmed to inform the driver of immediate conditions such as electrical problems, high temperature, low oil pressure, etc. through the use of digital text messages and any combination including LED's and audible alarms.

An additional element of the present invention consists of a flat digital touch screen and microprocessor that allows enhanced means of user input. The touch screen includes touch screen menus that allow the user to display, edit and create new service task schedules. A microprocessor with memory banks is provided to execute and store the data.

The present invention overcomes the shortcomings of the prior art by providing a digital vehicle service indicator unit that counts down the remaining mileage until multiple service tasks are due and is easily programmable by the user and further includes a remote transmitter that relays mileage data from the vehicles ECU to the digital display unit where a microprocessor adjusts the step-down odometers accordingly. Audible and visual alarms are also provided.

To the accomplishment of the above and related objects, this invention may be embodied in the form illustrated in the accompanying drawings, attention being called to the fact, however, that the drawings are illustrative only, and that changes may be made in the specific construction illustrated and described within the appended claims.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
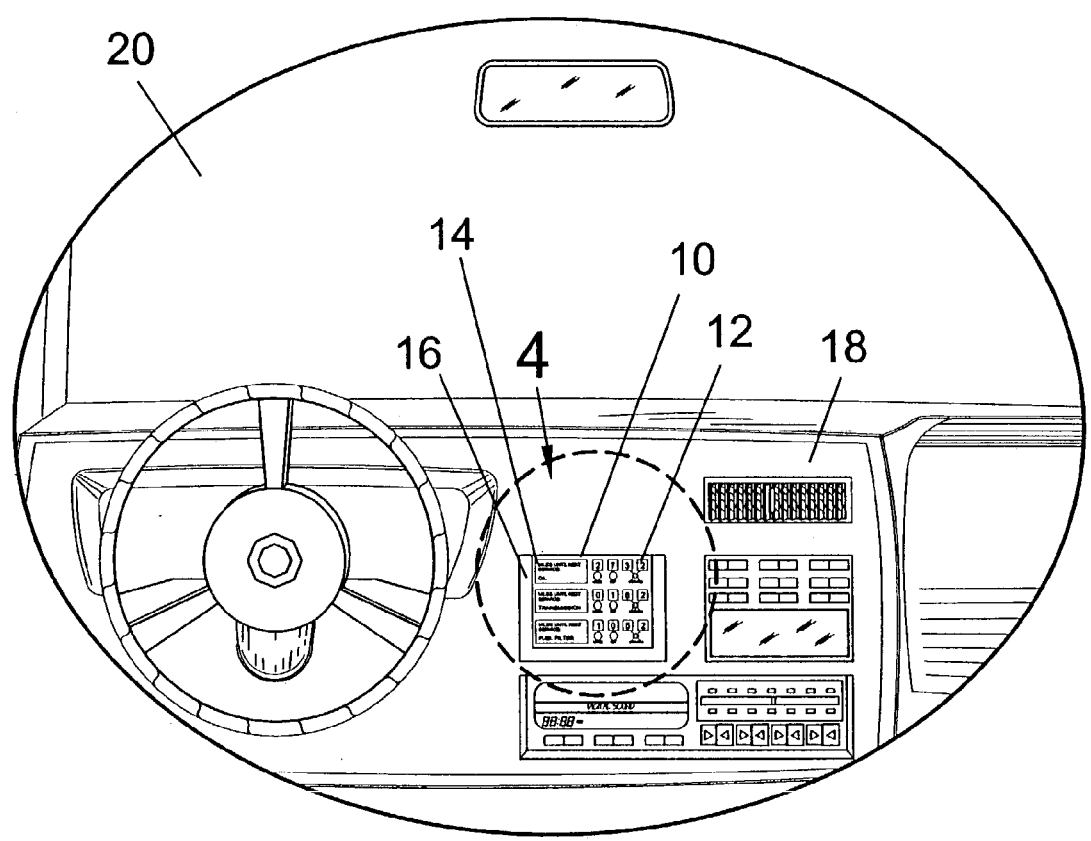
FIG. 1 is an illustrative view of the digital vehicle service indicator of the present invention mounted in a dashboard of a motor vehicle.

Turning now descriptively to the drawings, in which similar reference characters denote similar elements throughout the several views, the Figures illustrate the digital vehicle service indicator of the present invention. With regard to the reference numerals used, the following numbering is used throughout the various drawing figures.

10 digital vehicle service indicator
11 front side of the digital vehicle service indicator
12 step down odometer
13 rear side of the digital vehicle service indicator
14 programmable service task display
15 solar cells
16 slide retainer bracket
17 slide retainer bracket LED
18 dashboard
20 windshield
22 first variable mounting position
24 second variable mounting position
26 third variable mounting position
28 first programmable service task display
30 a first mode toggle button
32 a first set button
33 a first record button
34 a first indicator light
36 second programmable service task display
38 a second step down odometer
40 a second mode toggle button
42 a second set button
43 a second record button
44 a second indicator light
46 a third programmable service task display
48 a third step down odometer
50 a third mode toggle button
52 a third set button
53 a third record button
54 a third indicator light
56 universal mounting bracket
58 adhesive pad
60 fastening device
62 vehicle engine
64 Engine Control Unit (ECU)
66 transmitter
67 signal
68 receiver
70 microprocessor
72 speaker
74 audible alert sound
75 console
76 overhead console
78 instrument panel
80 remote data input device
82 input keypad
84 remote transmitter
86 remote input signal
87 data output port
88 data output port
89 communications wire
90 data input device
91 data output port
92 data input keypad
94 users hand
96 touch screen display
97 digital vehicle service indicator main menu
98 first touch menu option
100 second touch menu option
102 third touch menu option
104 fourth touch menu option
105 first programmable service task display
106 programmed service task
108 digital step down odometer
110 delete key
112 edit key
114 second programmable service task display
116 third programmable service task display
118 scroll up key
120 scroll down key
122 main menu key
124 edit screen of touch menu of digital vehicle service indicator
126 task input menu
128 mileage input menu
130 touch input keypad
132 log entry key
134 microphone
136 clock
138 service task history
140 memory

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning now descriptively to the drawings, in which similar reference characters denote similar elements throughout the several views, FIGS. 1 through 18 illustrate the digital vehicle service indicator of the present invention indicated generally by the numeral 10.

FIG. 1 is an illustrative view of the digital vehicle service indicator 10 of the present invention forming an integral part of a motor vehicle. The digital vehicle service indicator 10 can be factory installed or retrofitted to existing vehicles with a universal mounting bracket. The location of the digital vehicle service indicator 10 is manufacturer or user selectable. In the present figure, the digital vehicle service indicator 10 is mounted in the dashboard 18 of the vehicle in a position readily viewable for reading by the driver. The digital vehicle service indicator 10 includes at least one step down odometer 12 and at least one programmable service task display 14 associated with the at least one step down odometer 12. However, the desired embodiment of the digital vehicle service indicator consists of a plurality of step down odometers 12, each odometer 12 having a programmable task display 14 associated therewith. Each programmable task display 14 may be programmed to be associated with monitoring of any function desired by a user. The assignment of a function to the programmable service task display 14 for each respective step down odometer 12 can be specified at the time of manufacture or programmed by the user. The programmable task display 14 provides a visual indication of the function being monitored and the step down odometer 12 provides a numerical reading of a distance which must be traveled before service for the associated function indicated by the programmable task display 14 is required or recommended.

Figure 2:
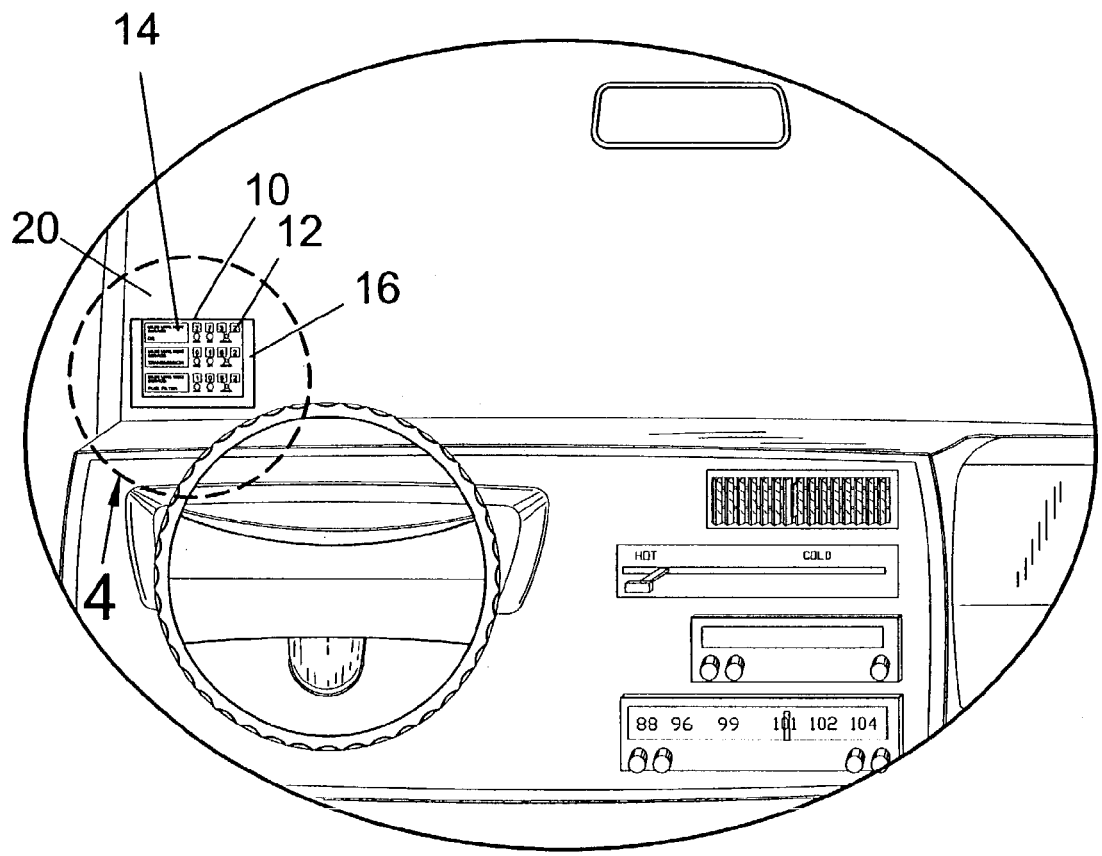
FIG. 2 is an illustrative view of the digital vehicle service indicator of the present invention selectively mounted within a mounting bracket positioned on a windshield of a vehicle.
Figure 6:
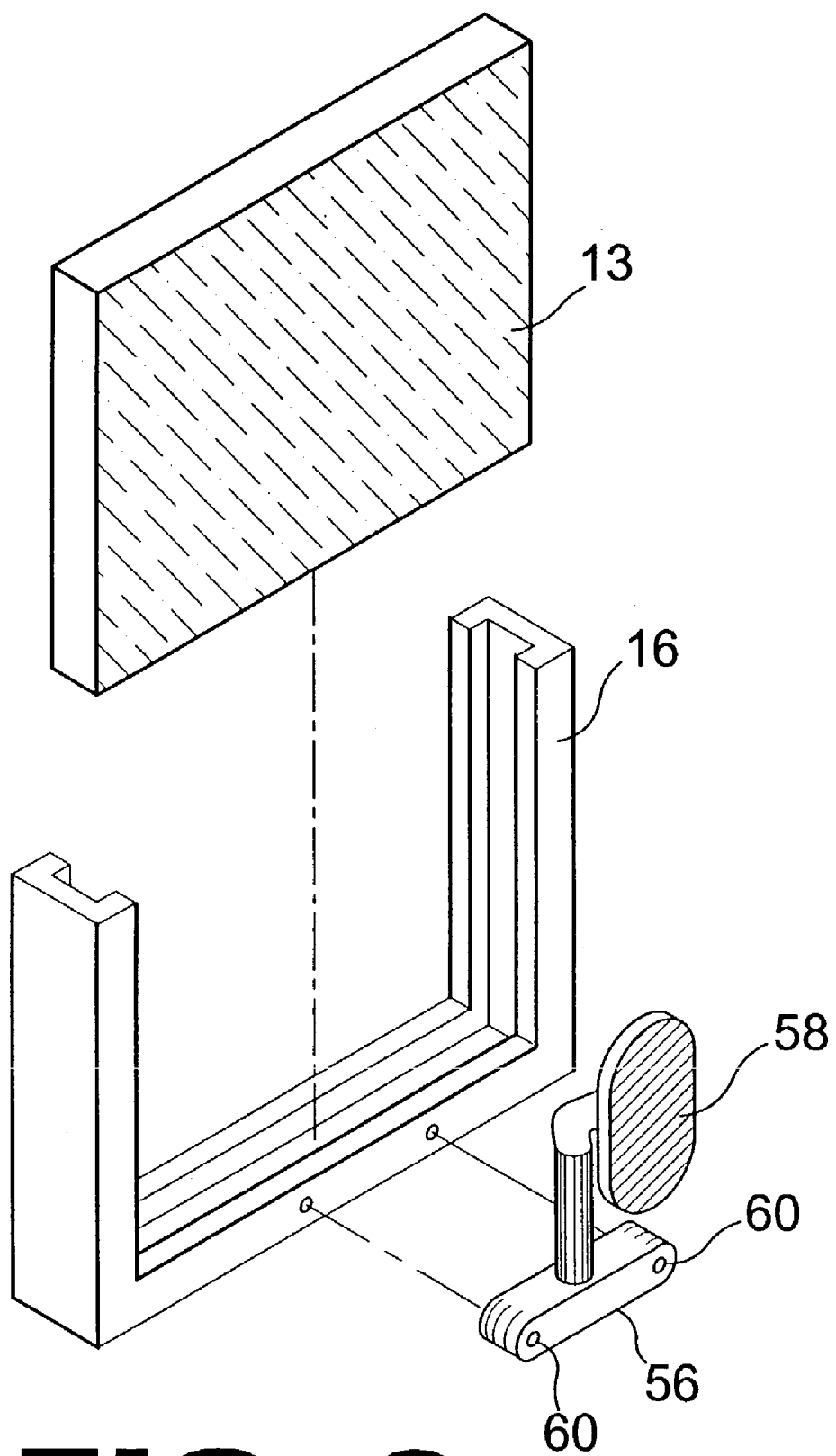
FIG. 6 is an exploded perspective view of the digital vehicle service indicator of the present invention showing the back side thereof.

FIG. 2 is an illustrative view of the digital vehicle service indicator 10 of the present invention mounted within a retainer bracket 16. The retainer bracket 16 is mounted on the windshield 20 of the vehicle. The digital vehicle service indicator 10 is shown in this figure mounted in a bottom driver's side corner of the windshield 20. The digital display unit 10 is selectively receivable within the slide retainer bracket 16. The slide retainer bracket 16 is removably fastened to a universal mounting bracket 56 as can be seen in FIG. 6. The universal mounting bracket 56 is releasably secured to the windshield 20 of the vehicle thereby releasably securing the digital vehicle service indicator 10 to the windshield 20. The digital vehicle service indicator 10 includes a plurality of step down odometers 12, each step down odometer 12 being associated with a programmable service task display 14. Each programmable service task display 14 is user definable to notify the user as to the number of miles, shown on the step down odometer 12, until the indicated service needs to be performed. Alternatively, the service task displays 14 may be preprogrammed upon assembly of the vehicle and programmed with factory data related to particular services required by the vehicle in which the digital vehicle service indicator 10 is positioned.

Figure 3:
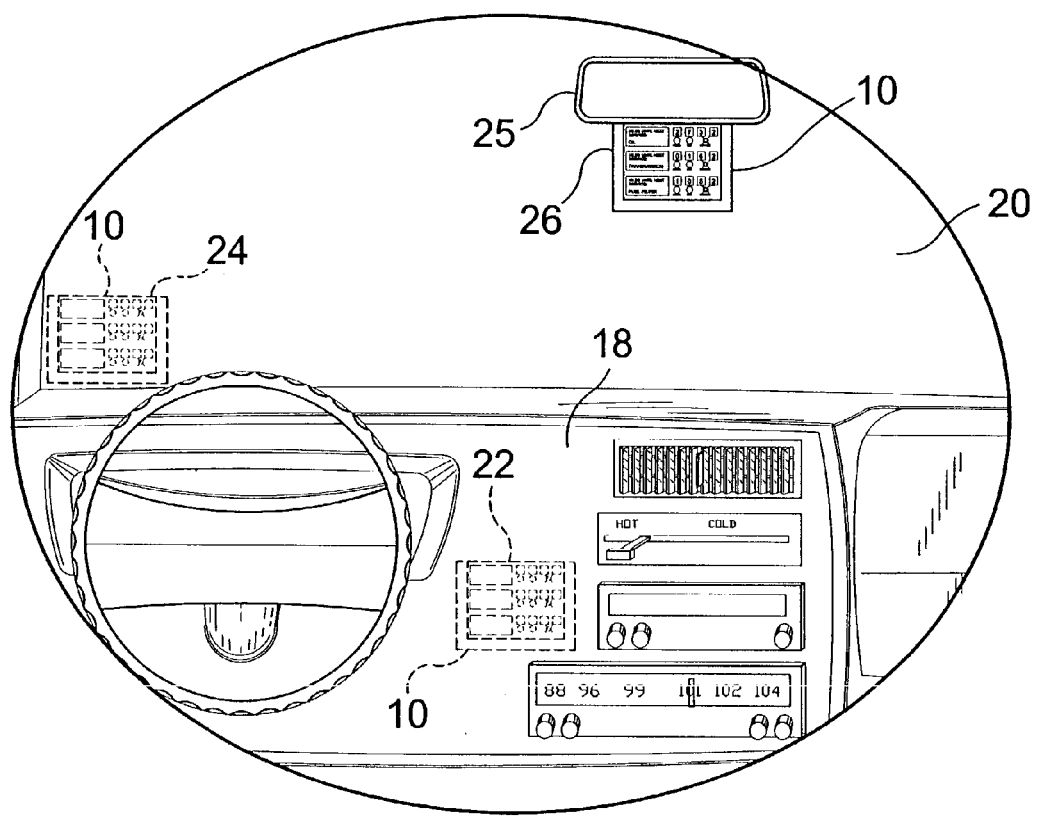
FIG. 3 is an illustrative view of the digital vehicle service indicator of the present invention showing alternate positions for mounting.

FIG. 3 is an illustrative view of the digital vehicle service indicator 10 of the present invention mounted in an alternate position on the windshield 20. This figure illustrates the digital vehicle service indicator 10 mounted adjacent a rear view mirror on the windshield 20. The digital vehicle service indicator 10 can have the universal mounting bracket 56 secured thereto as shown in FIG. 6 and discussed above with respect to FIG. 2 whereby the device can be releasably secured by the user at any desired location on the windshield 20 or dashboard 18 of the vehicle. Additional possible preferred positions for releasably mounting the digital vehicle service indicator 10 are illustrated in dashed lines in FIG. 3. The digital vehicle service indicator 10 may actually be mounted at any position within the vehicle desired by the user. The positions for the digital vehicle service indicator 10 illustrated in the Figures are for purposes of example only and not meant to limit the scope of the invention. A first possible preferred position 22 shows the digital vehicle service indicator 10 as an integral part of the vehicles dashboard 18 similar to the positioning illustrated in FIG. 1. It is likely that in this position 22, the digital vehicle service indicator 10 has been installed by the manufacturer of the vehicle. A second variable mounting position 24 illustrates the digital vehicle service indicator 10 releasably secured to the bottom driver's side corner of the windshield 20 of the vehicle similar to the position illustrated in FIG. 2. This position is desirable because it allows the user to have a clear view of maintenance tasks required for upkeep of the vehicle while not disrupting the user's view of the road surface. A third variable mounting position 26 illustrated in FIG. 3 positions the digital vehicle service indicator 10 in a releasably mounted fashion beneath the rearview mirror 25. This position is also desirable as the digital vehicle service indicator 10 does not obstruct the user's view of the road surface but does provide the user with a clear view of the digital vehicle service indicator 10. The first variable mounting position 22 does not require the use of a mounting bracket as it is permanently secured within the dashboard 18, wherein placement of the digital vehicle service indicator 10 in the second and third positions requires the universal mounting bracket 56 for releasably securing the digital vehicle service indicator 10 to the windshield 20. The universal mounting bracket 56 is used in combination with the slide retainer bracket 16, which receives the digital display unit 10, to adhesively fasten the digital vehicle service indicator 10 to a surface. Alternatively, a mating hook and loop fastener can be used to releasably secure the digital vehicle service indicator 10 and slide retainer bracket 16 to a surface whereby the user attaches one mating member to the back of the universal bracket and the other mating member of the hook and loop fastener to the desired location. The hook and loop fastener allows for easily repositioning the digital vehicle service indicator 10 in an alternate position.

Figure 4:
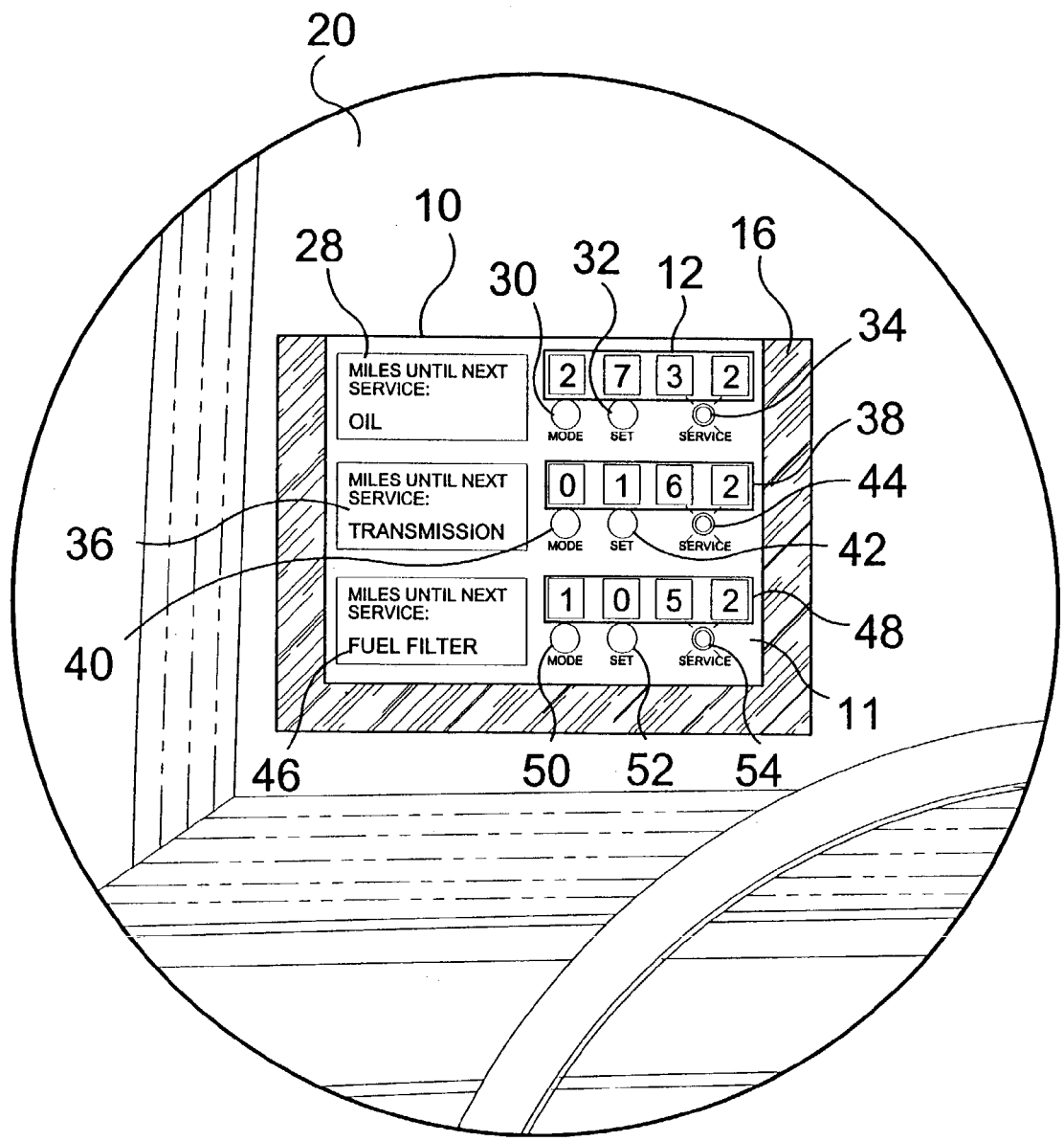
FIG. 4 is a front view of the digital vehicle service indicator of the present invention within a mounting bracket.

FIG. 4 is a front view of the digital vehicle service indicator 10 of the present invention including a mounting bracket for releasably securing the digital vehicle service indicator 10 to a surface. The digital vehicle service indicator 10 is shown removably mounted to a driver's side bottom corner of the windshield 20 of the vehicle. The digital vehicle service indicator 10 has a front side 11 which contains at least one step down odometer 12, and at least one programmable service task display 14. The step down odometer 12 counts down the number of miles until the specified service is required thereby tracking the number of miles traveled by the vehicle between service checks. Preferably, the digital vehicle service indicator 10 includes a plurality of step down odometers 12, each step down odometer 12 being associated with a respective programmable service task displays 14 for monitoring a respective function of the vehicle. The instant figure shows a first step down odometer 12 positioned adjacent a first programmable service task display 28. The first step down odometer 12 counts down the number of miles until the service task as identified on the first programmable service task display 28, is required by the vehicle. The first programmable service task display 28 monitors distance traveled between oil changes. The number of miles from which the first odometer 12 counts down from is user definable and can be input by pressing a predetermined combination of button strokes using a first mode toggle button 30 and a first set button 32. The first mode toggle button 30 and first set button 32 are located directly below the first step down odometer 12, and adjacent to the first programmable service task display 28. Also located adjacent the first step down odometer 12 is a first indicator light 34. When the mileage on the step down odometer 12 reaches zero, the first indicator light is illuminated thereby providing a visual signal indicating the recommended distance between service checks has been traveled by the vehicle. A second programmable service task display 36 associated with a second step down odometer 38 is positioned adjacent the first programmable service task display 28 and first step down odometer 12. The second programmable service task display 36 is used to keep track of a different service required by the vehicle and is also user definable. In the figure, the second programmable service task display 36 monitors the distance traveled between checking the transmission of the vehicle. The second programmable service task display 36 and second step down odometer 28 are controlled by using a second mode toggle button 40 and a second set button 42. The user is alerted to perform the required service displayed in the second programmable service task display 36 by a second indicator light 44 which is illuminated when the second step down odometer 38 reaches zero. This embodiment of the present invention further includes a third programmable service task display 46 that is associated with a third step down odometer 48. In the figure, the third programmable service task display 36 monitors the distance traveled between checking the fuel filter of the vehicle. The third programmable service task display 46 and third step down odometer 48 are controlled by using a third mode toggle button 50 and a third set button 52. The user is alerted to perform the required service displayed in the third programmable service task display 46 by a third indicator light 54 which is illuminated when the third step down odometer 48 reaches zero.

Alternatively, a wireless programming device or port may be used for programming the digital vehicle service indicator 10 with other tasks or functions requiring the use of step down odometers. When including an input port on the digital vehicle service indicator 10, an interface device can be attached thereto for programming the digital vehicle service indicator 10. The respective step down odometers display the remaining mileage until each respective service is due. In addition the digital display can be programmed for non-serviceable items, such as landmark and trip distance calculations.

Figure 5:
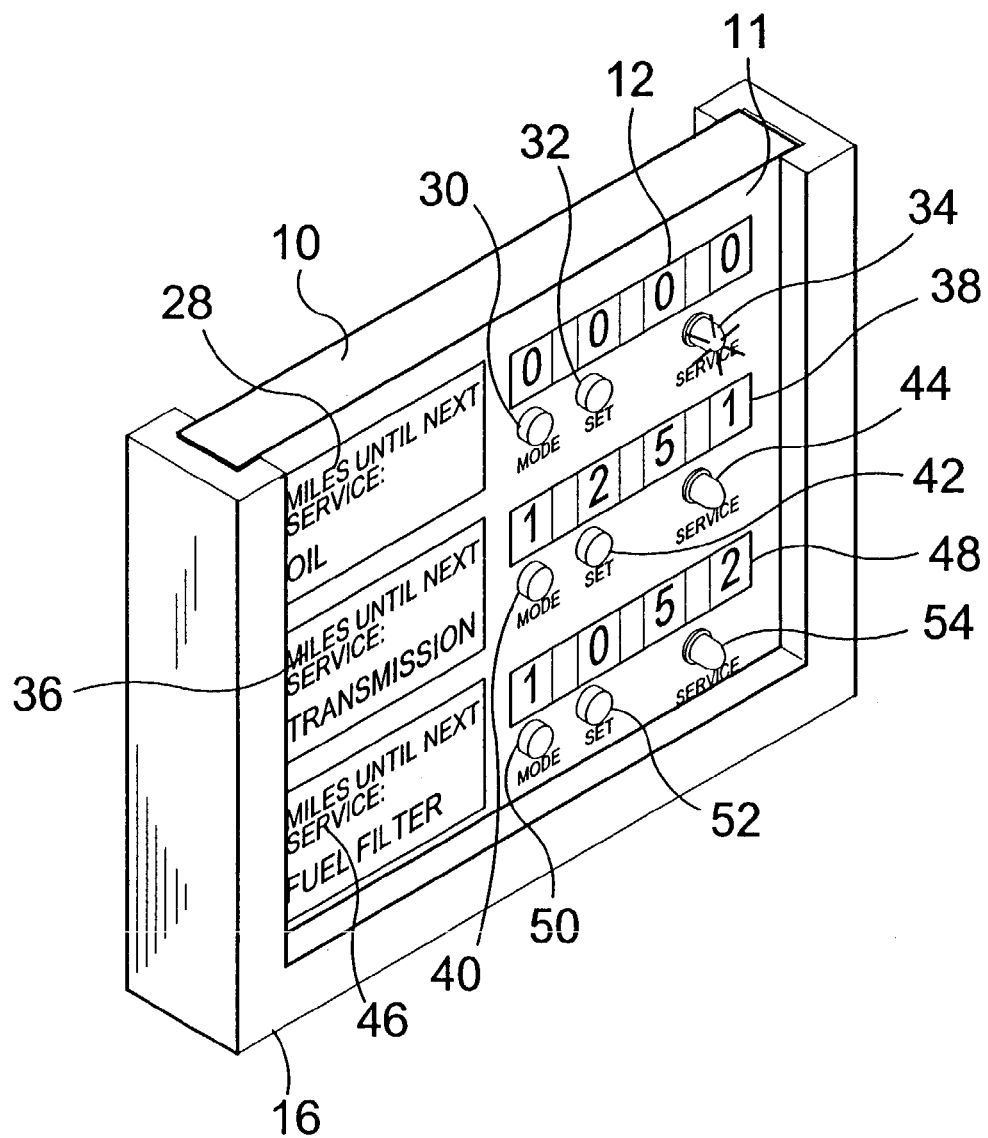
FIG. 5 is a perspective view of the digital vehicle service indicator of the present invention.

FIG. 5 is a perspective view of the digital vehicle service indicator 10 of the present invention showing a first indicator light 34 energized to alert the user that the first step down odometer has reached zero. The preferred embodiment of the present invention provides for three service tasks to be programmed into three programmable service task displays 28, 36, 46. Each programmable service task display 28, 36, 46 are associated with a respective step-down odometer 12, 38, 48. The mode buttons 30, 40, 50 and set buttons 32, 42, 52 are used to program the desired service tasks and the respective distances to be traveled until such tasks become due in the respective programmable service task displays 28, 36, 46 and step-down odometers 12, 38, 48. When a step down odometer reaches zero, as indicated in FIG. 5 on the first step down odometer 12, the respective indicator light 34 (led) is caused to illuminate. The led will remain illuminated until the service has been completed or the odometer has been reset by the user.

FIG. 6 is an exploded rear perspective view of the digital vehicle service indicator 10 of the present invention. Specifically, this view illustrates the digital display unit 13 and the slide retainer bracket 16. The slide retainer bracket 16 is a U-shaped element having channels 17 formed within the inner sides of the legs of the U-shaped element. The channels 17 formed within the inner sides of the legs of the U-shaped element are connected by a channel formed in the base of the U-shaped element. The digital display unit 13 is releasably secured within the channels 17 of the slide retainer brackets 16. The slide retainer bracket 16 is then releasably connected to the universal mounting bracket 56 via fasteners 60. The slide retaining bracket 16 which has received the digital display unit 13 is then releasably mounted on the windshield by an adhesive mounting pad 58 of the universal mounting bracket 56. It is preferred that the adhesive mounting pad 58 be adhesively secured to the windshield in a position that does not obscure the users view of the road surface. Preferably, the universal mounting bracket 56 has a peel and stick adhesive backing. However, the universal mounting bracket 56 may be formed from other embodiments such as an adhesive base similar to those that are used for rear view mirrors, or hook and loop fasteners.

Figure 7:
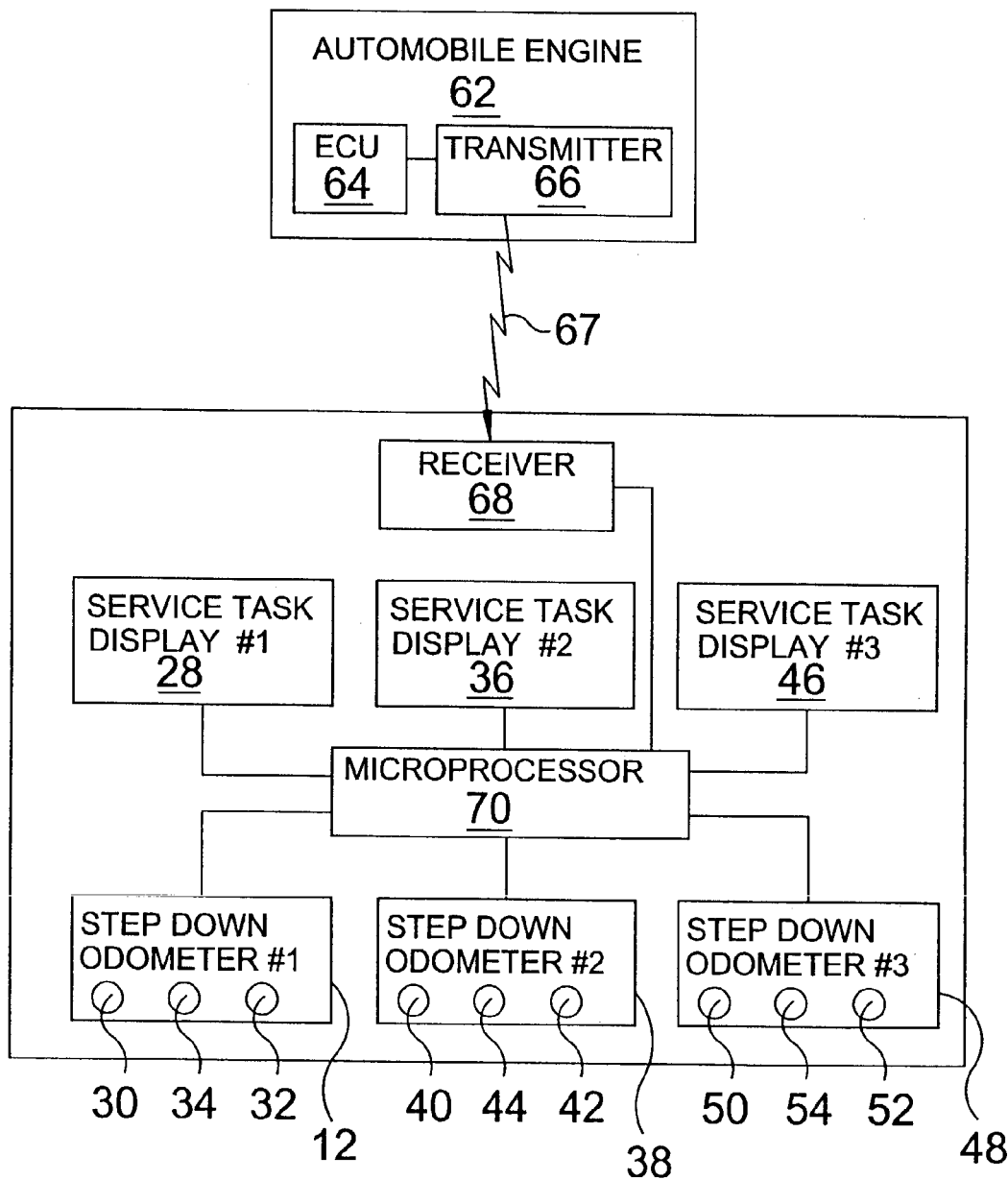
FIG. 7 is a block diagram of the digital vehicle service indicator of the present invention.

FIG. 7 is a block diagram of the digital vehicle service indicator 10 of the present invention. The digital vehicle service indicator 10 includes and is controlled by a microprocessor 70. The microprocessor 70 is connected to each of the programmable service task displays 28, 36, 46 and also to each of the step down odometers 12, 38, 48. The microprocessor 70 can store service tasks for at least 1 service task. Preferably, the microprocessor 70 is able to store data related to service tasks for each of the programmable service task displays connected thereto. For ease of discussion, the functionality of the digital display unit will be discussed with reference to the first programmable service task display 28 and the first step down odometer 12. It is to be realized that the other programmable service task displays and step down odometers operate in an identical manner. In order to program the programmable service task display 28 and the first step down odometer 12, the user depresses a predetermined combination of key strokes using the first mode toggle button 30 and the first set button 32 of the service task display 28. Activation of the mode toggle button determines which task is to be analyzed and how many miles until the task is to be performed. The microprocessor 70 includes a memory unit which is able to store certain functions which may be monitored. Each activation of the mode toggle button causes the microprocessor 70 to display a different function on the service task display 28. Upon display of the desired function, the user activates the set button 32. The microprocessor 70 also communicates with the first step down odometer 12 and displays the number of miles selected by the user until the service task need be performed. The vehicle has an engine 62. The vehicle engine 62 has an engine control unit 64 which controls the necessary automotive operations and monitors the operations being controlled. For our purpose here, the relevant operation controlled by the engine control unit 64 is the number of miles the vehicle has traveled. The engine control unit 64 is able to monitor the rotation of the wheels of the vehicle and thus determine the distance traveled by the vehicle. At predetermined intervals, such that are known in the art, the engine control unit 64 communicates with a transmitter 66, which remotely transmits the number of miles traveled by the vehicle to a receiver 68 of the digital display unit 10. The receiver 68 is connected to the microprocessor 70 and sends the number of miles traveled thereto. The microprocessor 70 then communicates with the first step down odometer 12 and reduces the number displayed on the first step down odometer by the number of miles traveled by the vehicle. This process continues until the value displayed by the step down odometer 12 reaches zero. The microprocessor 70 then causes the first indicator light 34 to be illuminated thereby alerting the user that the service task displayed on the programmable service task display 28 needs to be performed. The microprocessor 70 controls the functions of the second and third step down odometers 38, 48 and second and third programmed service displays 36, 46 in the same manner as described above.

Figure 8:
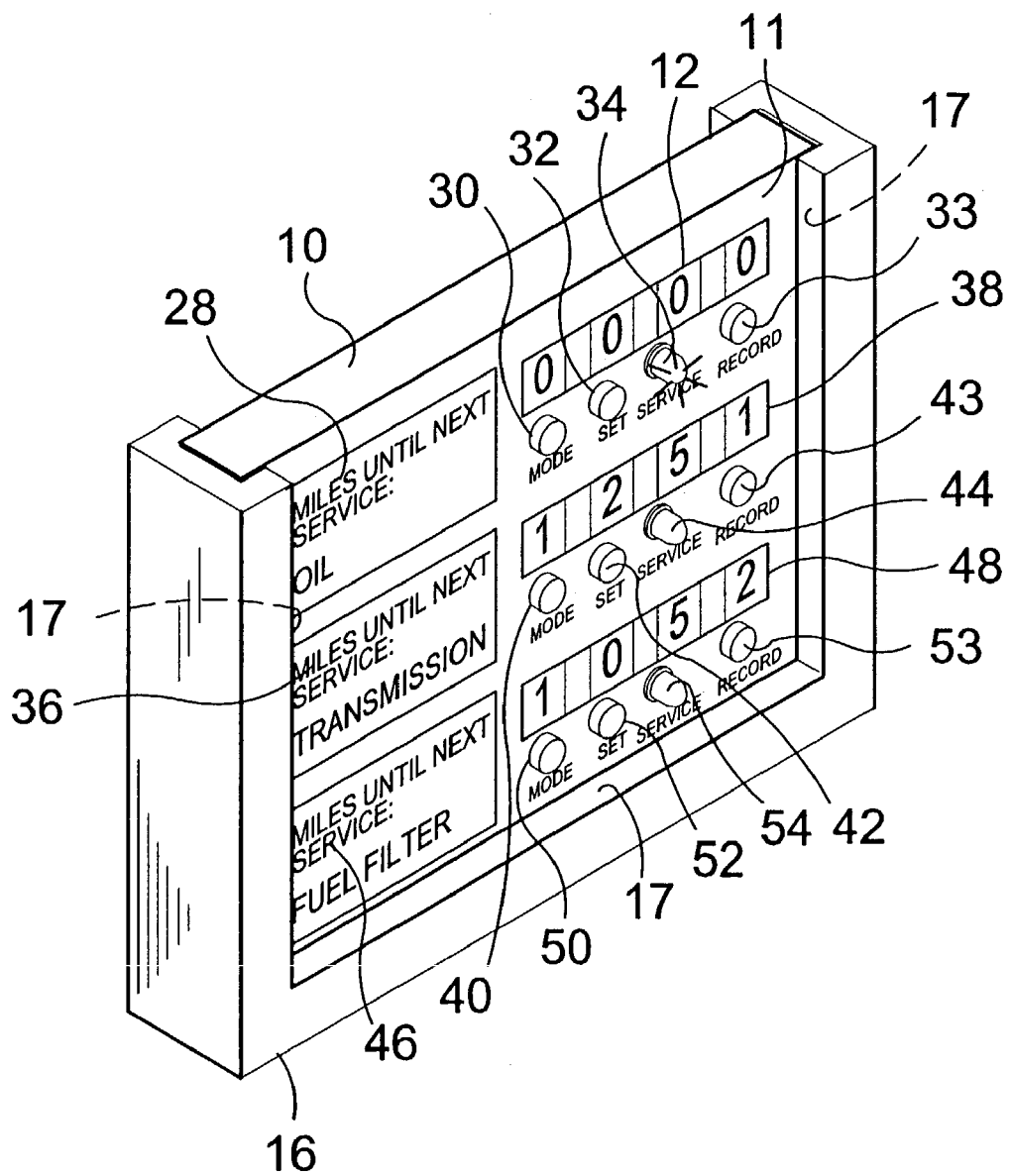
FIG. 8 is a perspective view of an alternate digital vehicle service indicator of the present invention with a lighting and record mode.
Figure 9:
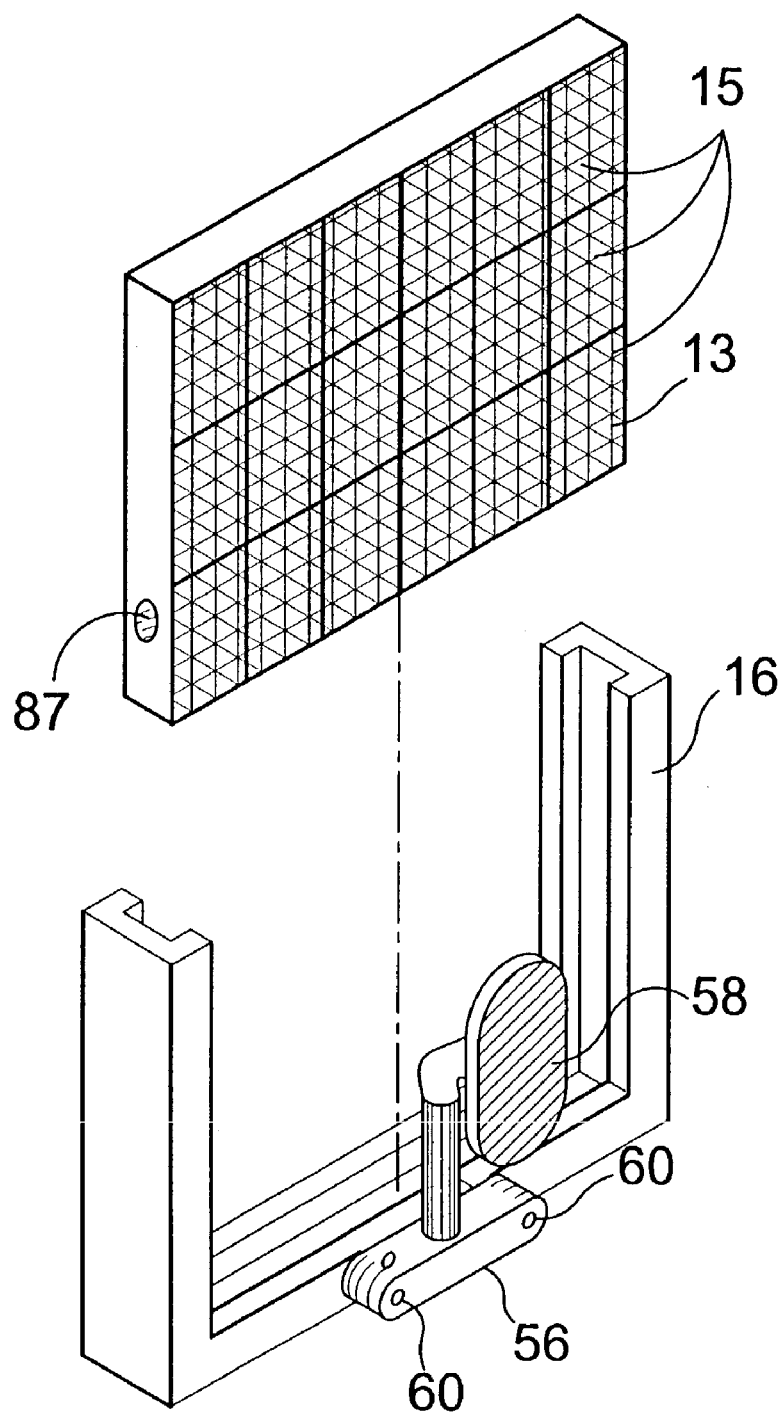
FIG. 9 is an exploded perspective view of the alternate digital vehicle service indicator of the present invention showing the back side having a power source.

FIG. 8 is a perspective view of an alternate digital vehicle service indicator 10 of the present invention showing the slide retainer bracket 16 with at least one slide retainer bracket lamp 17 illuminating the front side of the digital vehicle service indicator. The power supplying the electrically components of the digital vehicle service indicator can be obtained from the vehicle's electrical system or from an alternate source such as, replaceable batteries or rechargeable batteries using solar cells as a power source as shown in FIG. 9. The first indicator light 34 is energized to alert the user that the first step down odometer has reached zero. The preferred embodiment of the present invention provides for three service tasks to be programmed into three programmable service task displays 28, 36, 46. Each programmable service task display 28, 36, 46 are associated with a respective step-down odometer 12, 38, 48. The mode buttons 30, 40, 50 and set buttons 32, 42, 52 are used to program the desired service tasks and the respective distances to be traveled until such tasks become due in the respective programmable service task displays 28, 36, 46 and step-down odometers 12, 38, 48. The record buttons 33, 43, 53 record the respective service task and odometer reading from the ECU for uploading through outlet port 91 shown in FIG. 9 to other electronic devices such as PDA, laptop or PC that uses the information to produce a motor vehicle maintenance log.

FIG. 9 is a rear perspective view of the alternate digital vehicle service indicator 10 of the present invention. Illustrated is the digital display unit 13 and the slide retainer bracket 16 having channels 17 formed within the inner sides of the legs of the U-shaped element. The digital display unit 13 is releasably secured within the channels 17 of the slide retainer brackets 16. The slide retaining bracket 16 which has received the digital display unit 13 is then releasably mounted on the windshield by an adhesive mounting pad 58 of the universal mounting bracket 56.

Additionally, shown is an alternate power source in the form of solar cells 15 mounted to the rear side of the digital vehicle service indicator 13 that can be used to charge rechargeable batteries as a power source for the electrical needs of the digital vehicle service indicator 10.

Figure 10:
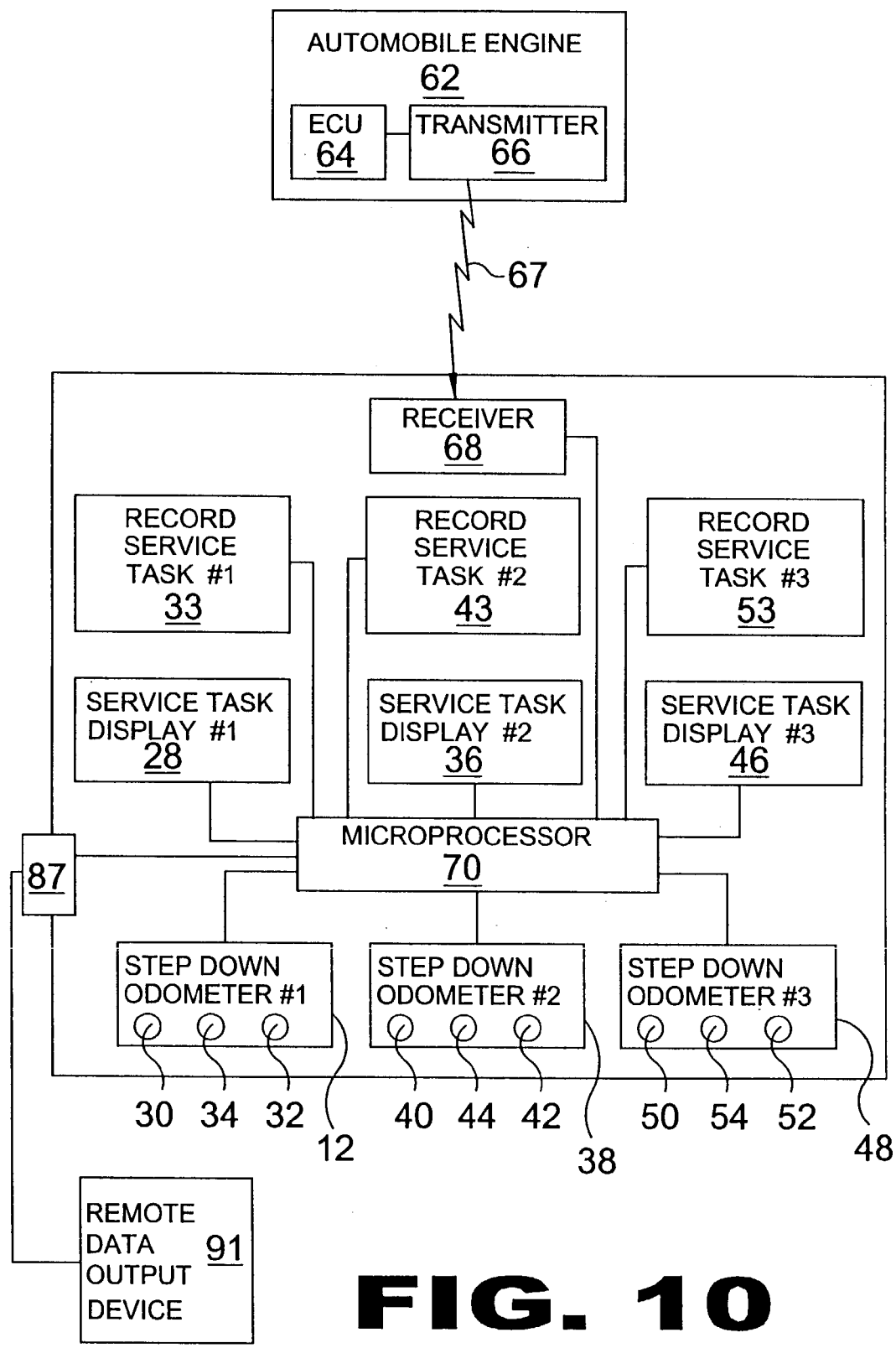
FIG. 10 is a block diagram of the alternate digital vehicle service indicator of the present invention with a record function.

FIG. 10 is a block diagram of the alternate digital vehicle service indicator 10 of the present invention. The digital vehicle service indicator 10 includes and is controlled by a microprocessor 70. The microprocessor 70 is connected to each of the programmable service task displays 28, 36, 46 and also to each of the step down odometers 12, 38, 48 and record display functions 33, 43, 53. The microprocessor 70 can store service tasks for at least 1 service task. Preferably, the microprocessor 70 is able to store data related to service tasks for each of the programmable service task displays connected thereto. For ease of discussion, the functionality of the digital display unit will be discussed with reference to the first programmable service task display 28, the first step down odometer 12 and the first record function 33. It is to be realized that the other programmable service task displays, step down odometers and record functions operate in an identical manner.

In order to program the programmable service task display 28 and the first step down odometer 12, the user depresses a pre-determined combination of key strokes using the first mode toggle button 30 and the first set button 32 of the service task display 28. Activation of the mode toggle button determines which task is to be analyzed and how many miles until the task is to be performed. Upon display of the desired function using the mode button, the user activates the set button 32. The microprocessor 70 communicates with the first step down odometer 12 and displays the number of miles selected by the user until the service task need be performed.

The vehicle engine 62 has an engine control unit 64 which controls the necessary automotive operations and monitors the operations being controlled. The engine control unit 64 communicates with a transmitter 66, which remotely transmits the number of miles traveled by the vehicle to a receiver 68 of the digital display unit 10. The receiver 68 is connected to the microprocessor 70 and sends the number of miles traveled thereto. The microprocessor 70 then communicates with the first step down odometer 12 and reduces the number displayed on the first step down odometer by the number of miles traveled by the vehicle. This process continues until the value displayed by the step down odometer 12 reaches zero. The microprocessor 70 then causes the first indicator light 34 to be illuminated thereby alerting the user that the service task displayed on the programmable service task display 28 needs to be performed. After the service task has been performed the user can record the service task and ECU odometer reading to the microprocessor memory for later download through outlet port 91 creating a motor vehicle maintenance log. The microprocessor 70 controls the functions of the second and third step down odometers 38, 48, second and third programmed service displays 36, 46 and second and third record function 43, 53 in the same manner as described above. The present invention provides for an additional element in the form of a clock for recording date and time along with the ECU odometer reading as an enhancement of the recording function performed by 33, 43, and 53.

Figure 11:
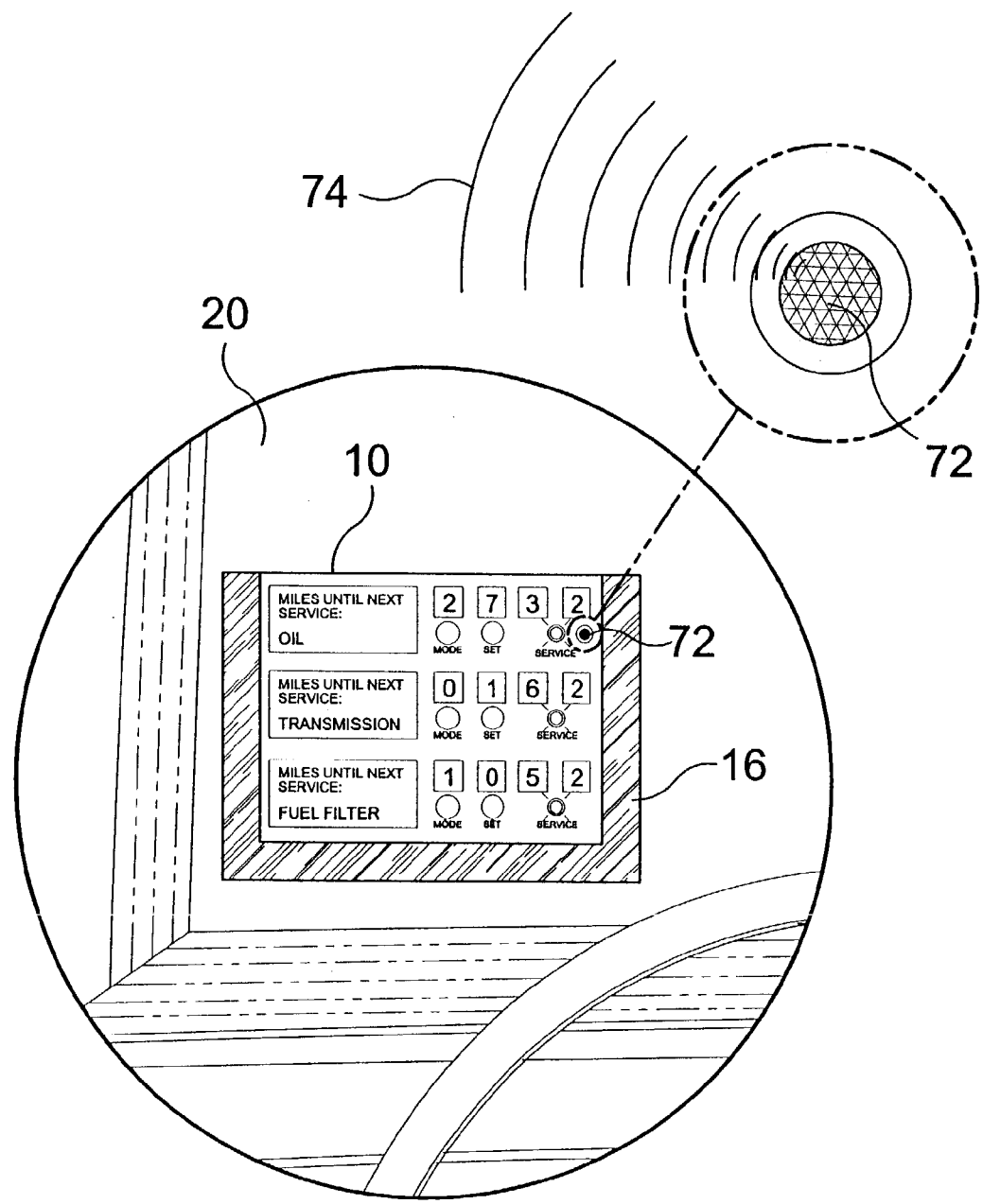
FIG. 11 is a front view of the digital vehicle service indicator of the present invention with audible and visual alarm capabilities.

FIG. 11 is a front view of the digital vehicle service indicator 10 of the present invention with audible and visual alarm capabilities. This embodiment of the digital display unit 10 shows the unit received by the slide retainer bracket and releasably secured to the windshield 20. This embodiment provides an audio alarm 72 is connected to and controlled by the microprocessor 70 to emit a sound 74 when the step down odometer 12 reaches zero. The audio alarm 72 is provided alone or in addition to the visual indication provided by the visual indicator light 34.

Figure 12:
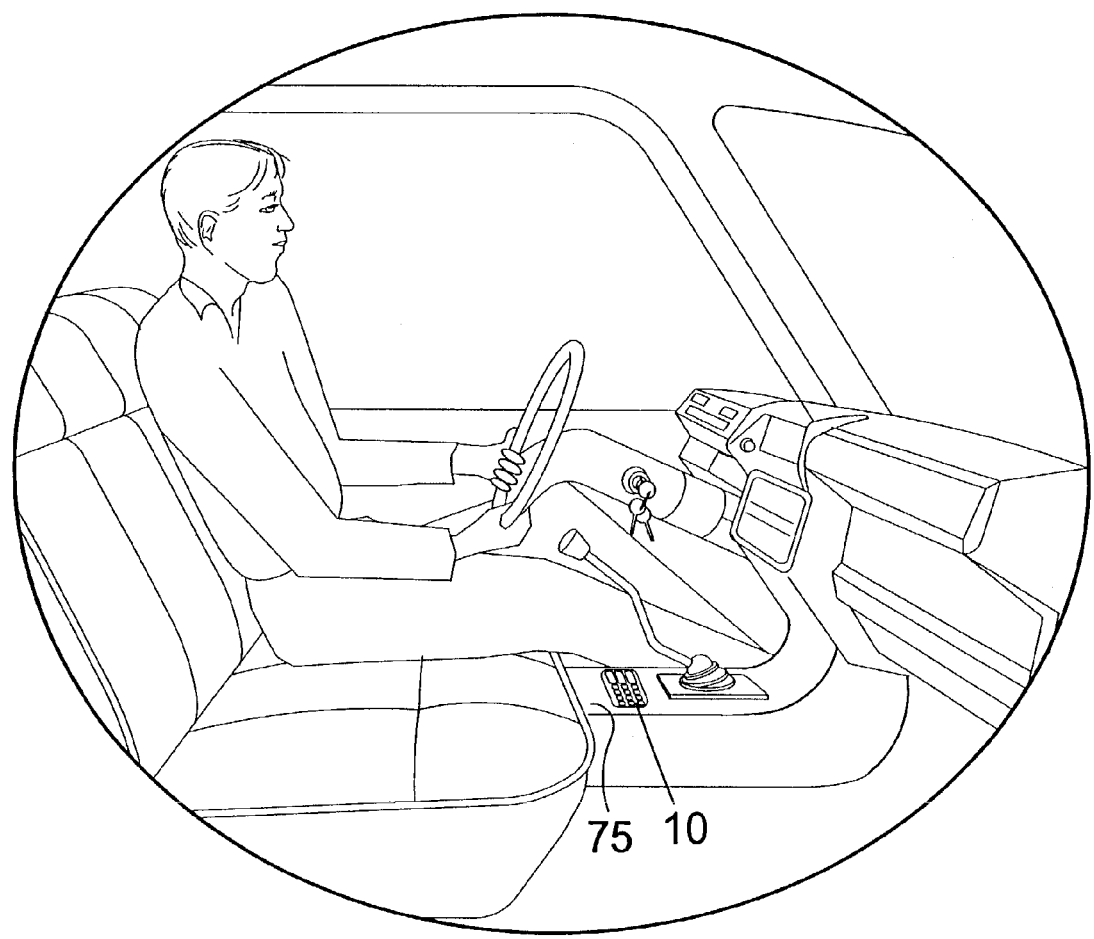
FIG. 12 is an illustrative view of the digital vehicle service indicator of the present invention mounted adjacent a driver's seat within a vehicle.
Figure 13:
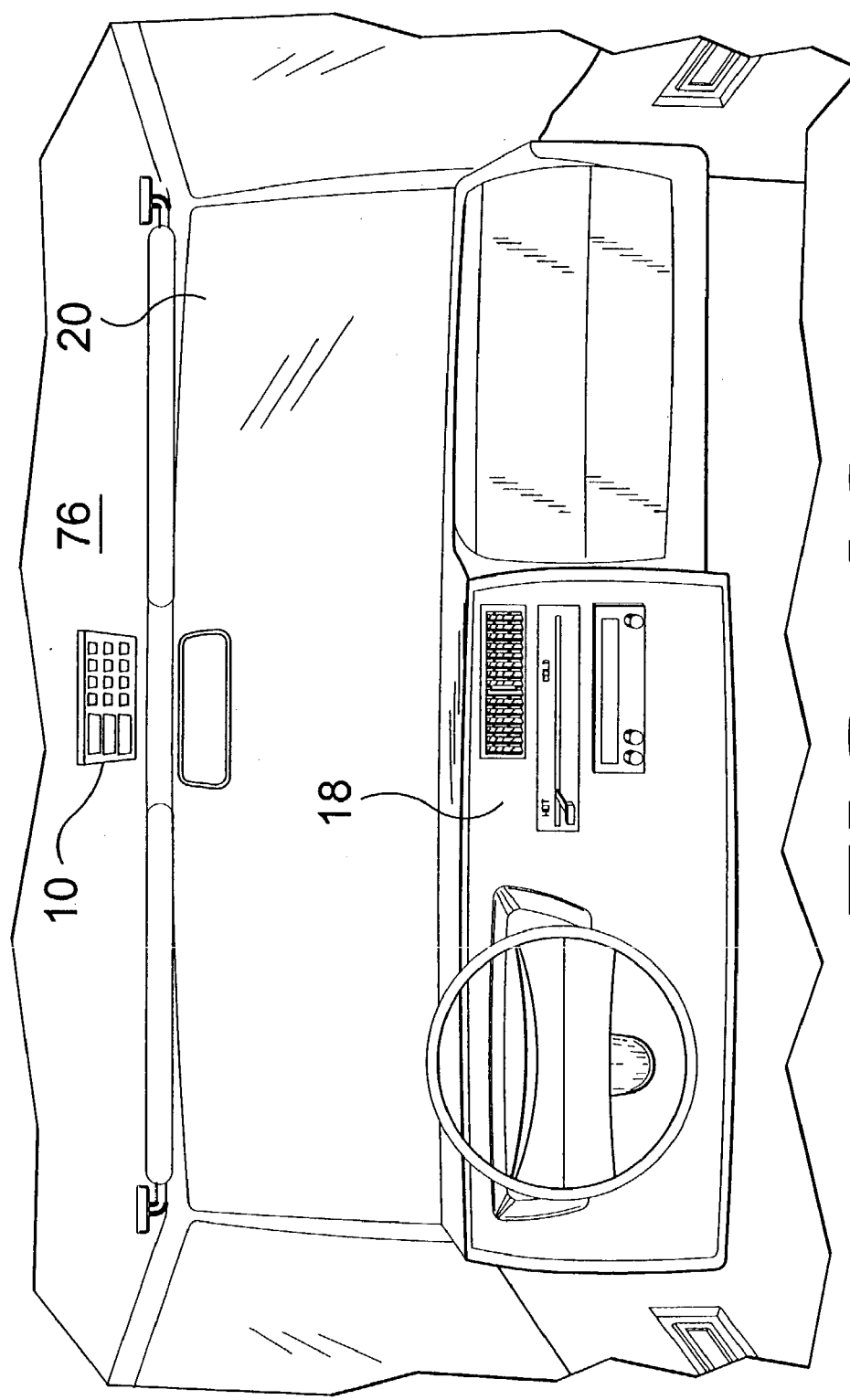
FIG. 13 is an illustrative view of the digital vehicle service indicator of the present invention mounted on a roof of a vehicle.
Figure 14:
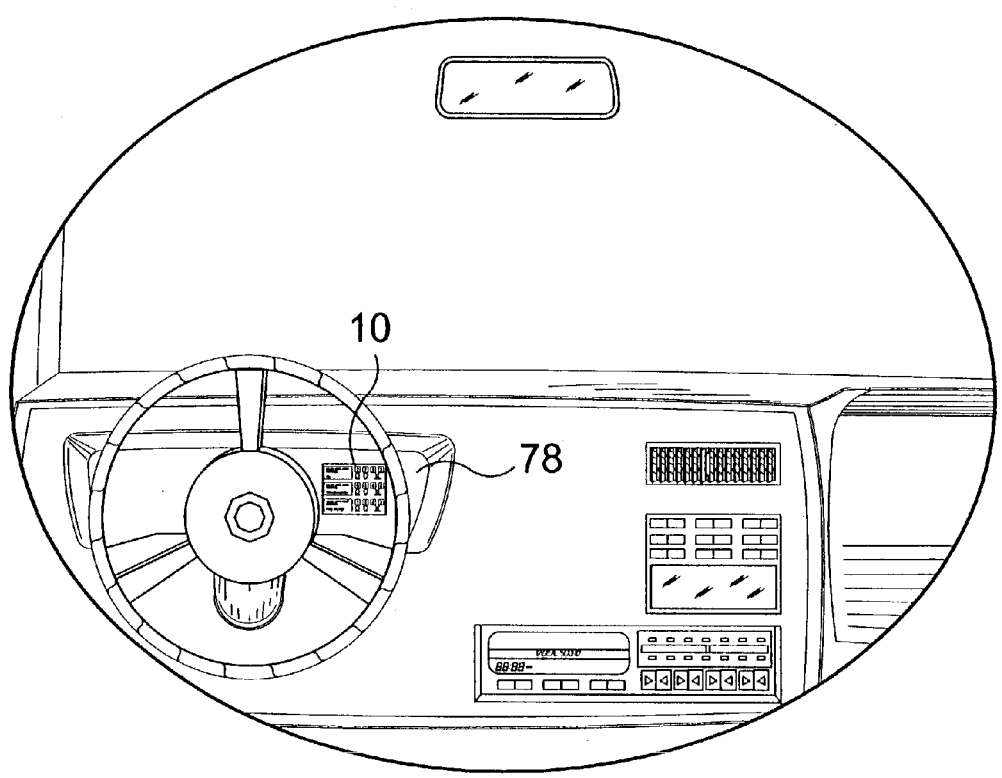
FIG. 14 is an illustrative view of the digital vehicle service indicator of the present invention mounted adjacent the steering wheel of a vehicle.

FIGS. 12, 13, and 14 are illustrative views of the digital vehicle service indicator of the present invention installed within a vehicle. FIG. 12 shows the digital display unit 10 is factory installed into the console 75 for easy programming and convenient viewing. FIG. 13 shows the digital display unit 10 is factory installed in the headliner 76 shows the rear view mirror 25 for easy programming and convenient viewing. FIG. 14 shows the digital display unit 10 factory installed into the instrument control panel 78 of the dashboard 18 for easy programming and convenient viewing.

Figure 15:
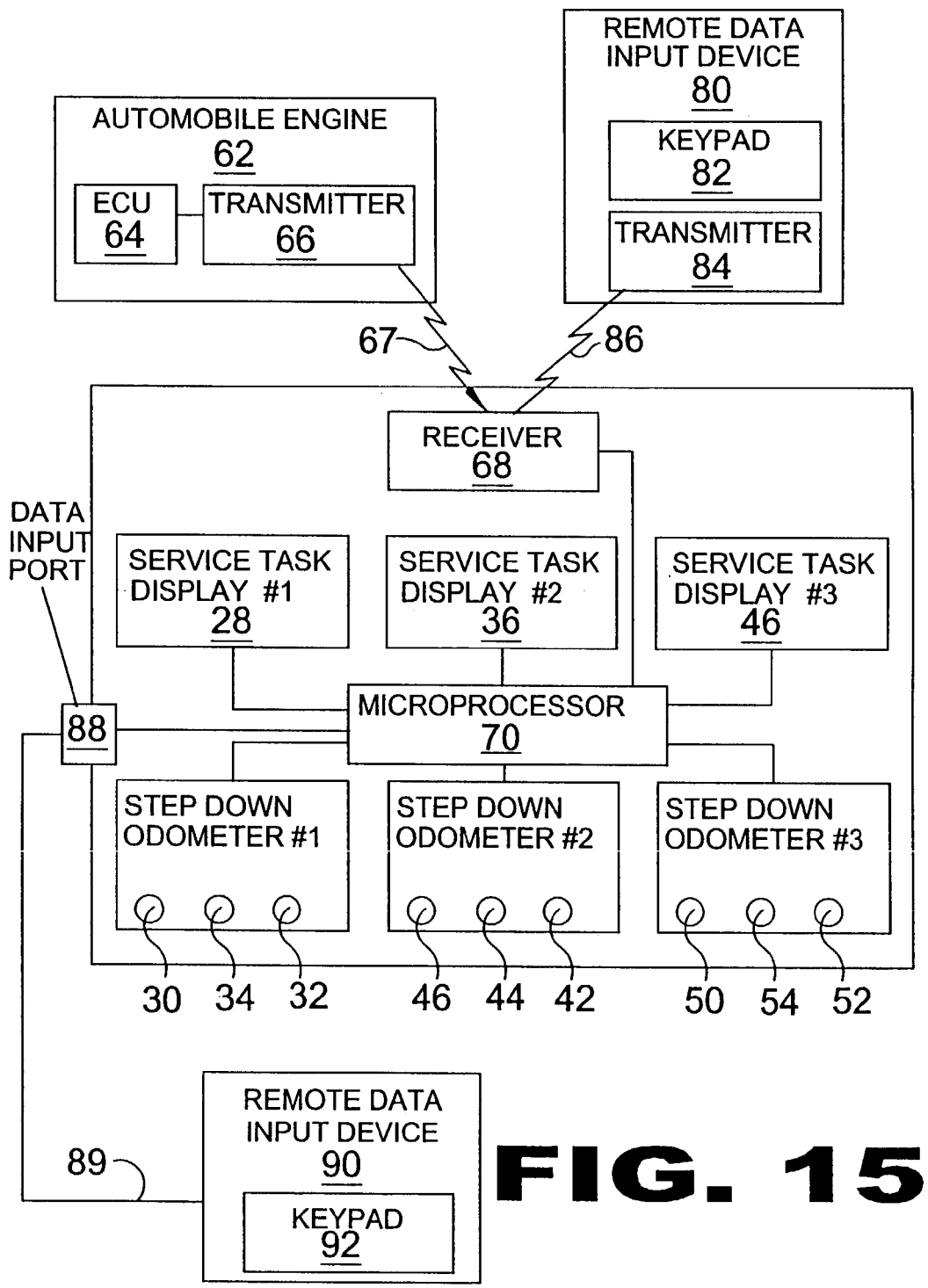
FIG. 15 is a block diagram of the digital vehicle service indicator of the present invention.

FIG. 15 is a block diagram of an alternative embodiment of the digital vehicle service indicator 10 of the present invention. The digital vehicle service indicator 10 is controlled by a microprocessor 70. The microprocessor 70 is connected to and controls operation of the programmable service task displays 28, 36, 46 and the step down odometers 12, 38, 48. The microprocessor 70 can store service tasks for at least 1 service task. Preferably, the microprocessor 70 is able to store data related to service tasks for each of the programmable service task displays connected thereto. For ease of discussion, the functionality of the digital display unit 13 will only be discussed in reference to the first programmable service task display 28 and the first step down odometer 12. The user depresses a pre-determined combination of key strokes using the first mode toggle button 30 and the first set button 32 to determine which task is to be analyzed and how many miles remaining to be traveled before the task is needed to be performed. The microprocessor 70 includes a memory unit which is able to store certain functions which may be monitored. Each activation of the mode toggle button 30 causes the microprocessor 70 to display a different function on the service task display 28. Activation of the mode toggle button transmits a signal to the microprocessor 70 which communicates with the first programmable service task display 28 and displays the user selected task to the user. Upon display of the desired function, the user activates the set button 32. The microprocessor 70 also communicates with the first step down odometer 12 and displays the number of miles remaining to traveled as selected by the user until the service task need be performed. The number of miles is set by activation of a toggle and set button on the odometer in the same manner as described above regarding the service task display. Each individual service task display and its respective odometer are set in the same manner described above.

The vehicle has an engine 62. The vehicle engine 62 has an engine control unit which controls the necessary automotive operations. For our purpose here, the relevant operation controlled by the engine control unit 64 is the number of miles the vehicle has traveled. At predetermined intervals, such that are known in the art, the engine control unit 64 communicates with a transmitter-66, which transmits a signal indicative of the number of miles traveled by the vehicle to a receiver 68 the digital display unit 10. The receiver 68 communicates with the microprocessor 70 and sends a signal indicative of the number of miles traveled thereto. The microprocessor 70 then communicates with the first step down odometer 12 and reduces the number displayed on the first step down odometer by the number of miles traveled by the vehicle as indicated by the signal transmitted to the microprocessor 70. This process continues until the number displayed by the step down odometer 12 is reduced to a value of zero. The microprocessor then causes the first indicator light 34 to be illuminated thereby alerting the user that the programmed service task, displayed on the programmable service task display 28 needs to be performed. The microprocessor 70 controls the functions of the second and third step down odometers 38,48 and second and third programmed service displays 36,46 in the same manner as described above.

This embodiment of the digital vehicle service indicator 10 further includes a remote data input device 80 which is comprised of an alphanumeric keypad 82 and a remote transmitter 84. This remote data input device 80 allows for a user to selectively determine which service task and/or mileage is inputted into the digital display unit 10. The remote data input unit 80 communicates with the digital display unit 10 via the remote transmitter 84 and the data 86 is thus received by the receiver 68 of the digital display unit 10. The receiver 68 transmits the received data 86 to the microprocessor 70. The microprocessor 70 then sends the data 86 to at least one of the programmable service task display 28, 36, 46, and the step down odometer 12, 38, 48. The data 86 can include at least one of the service task and the mileage to begin the countdown from. Further depicted is a data input port 88 for which a data input device 90 is connected thereto. The data input device 90 includes an alphanumeric keypad 92 for the user to input either the service task or the mileage into the digital display unit 10. The data input device 90 communicates with the digital display unit via communication wire 89. The data entered from the data input device 90 is transferred along the communication wire 89 and enters the digital display unit 10 at the data input port 88. The data is then communicated from the data input port 88 to the microprocessor 70. The microprocessor 70 sends the received data 86 to at least one of the programmable service task display 28, 36, 46 and the step down odometer 12, 38, 48. The data 86 can include at least one of the service task and the mileage to begin the countdown from.

Figure 16:
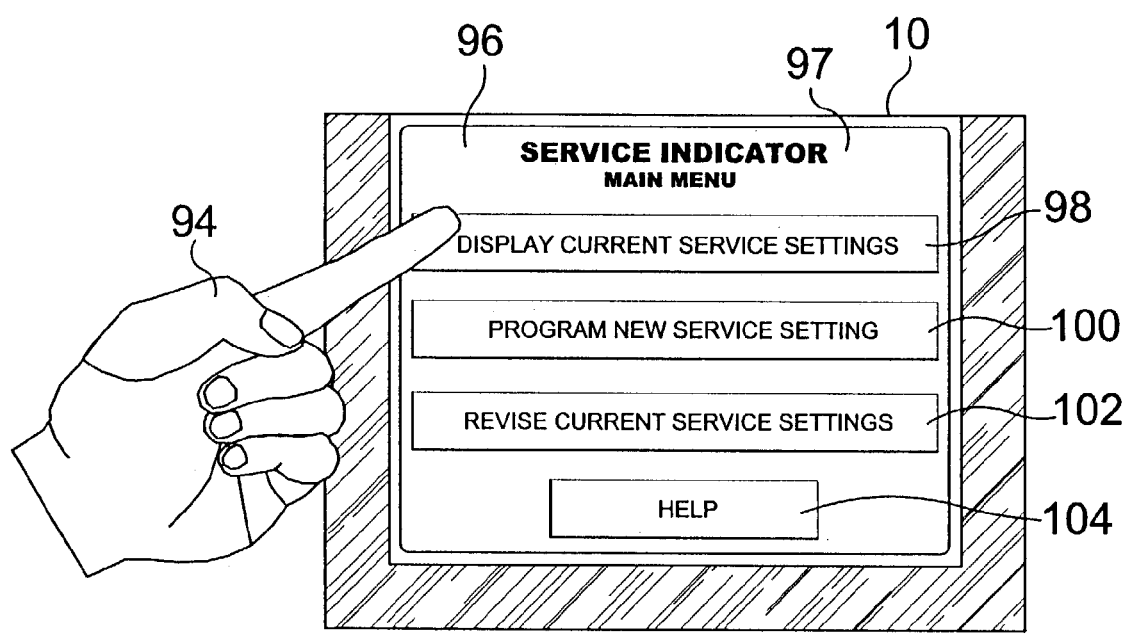
FIG. 16 is a front view of the digital vehicle service indicator of the present invention including a menu system for inputting data.
Figure 17:
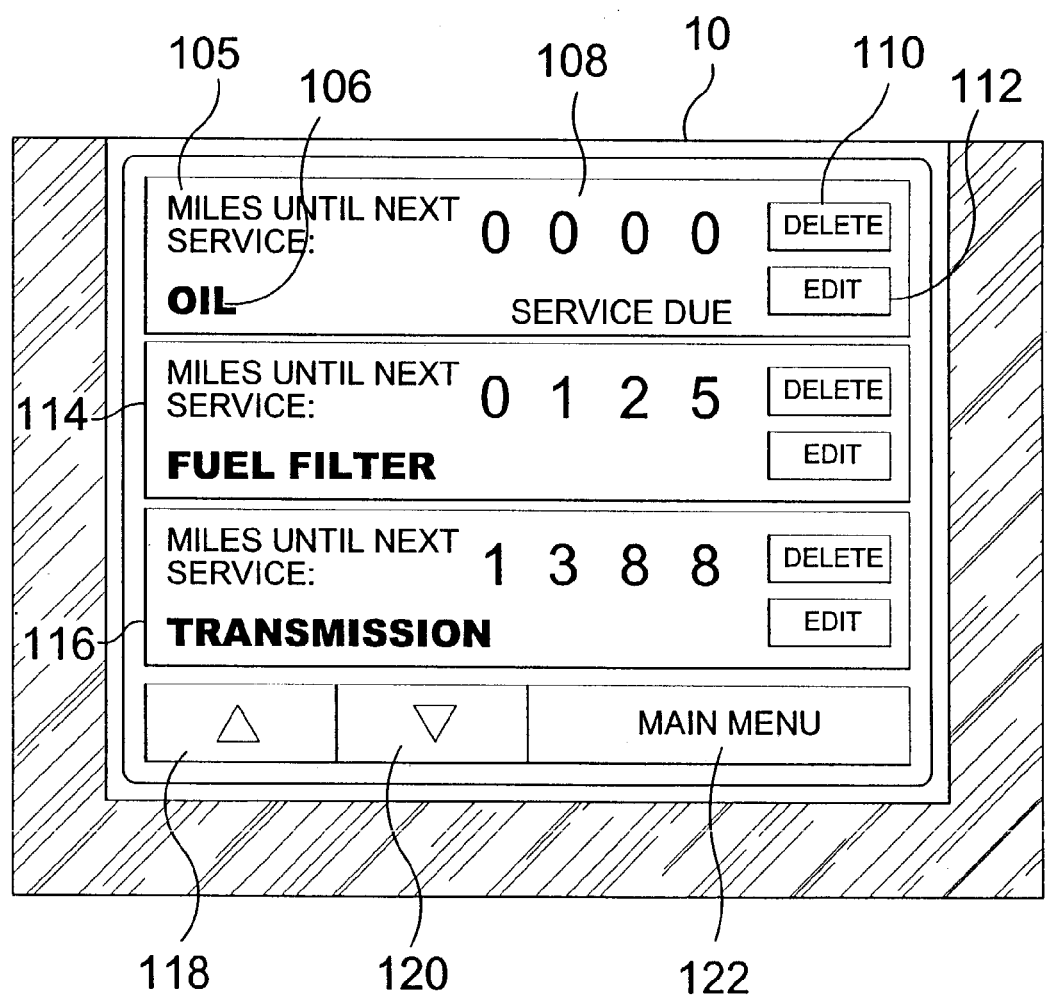
FIG. 17 is a front view of the digital vehicle service indicator of the present invention.
Figure 18:
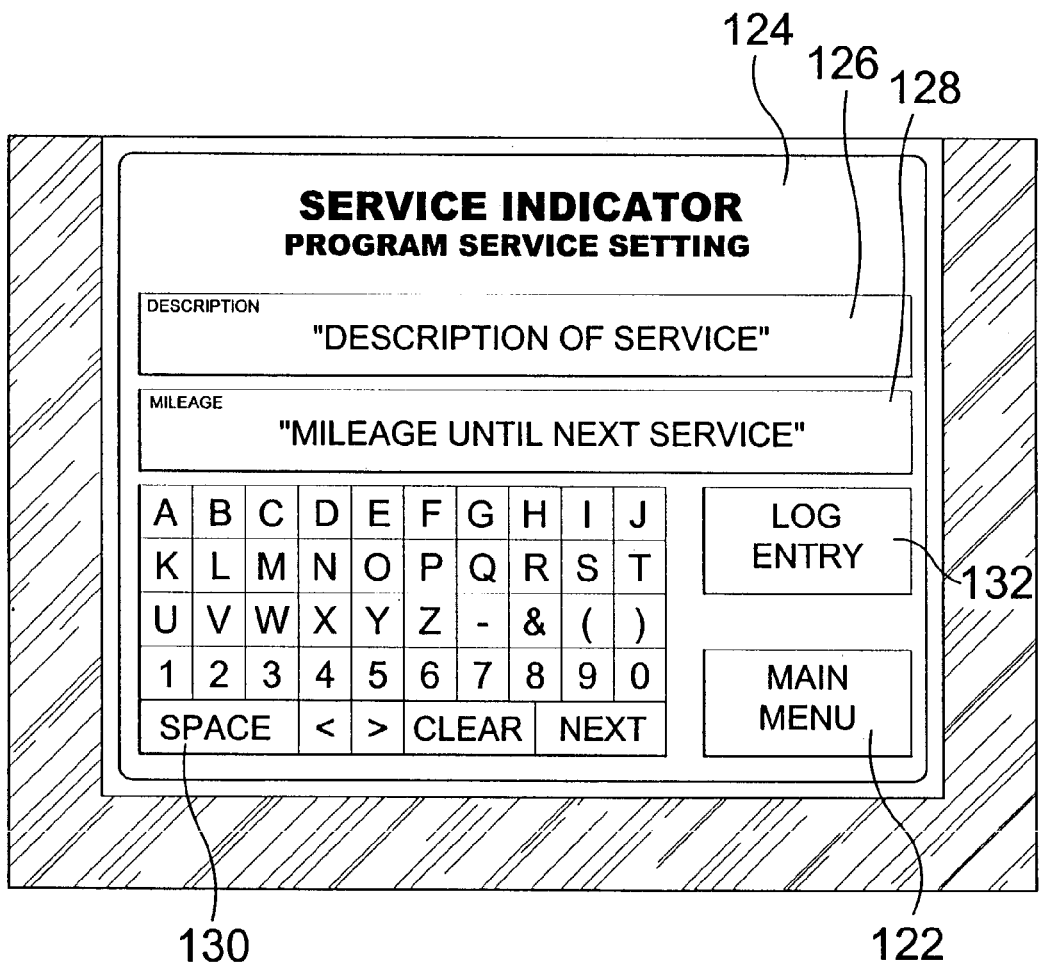
FIG. 18 is a front view of the digital vehicle service indicator of the present invention including alternative input means.

FIGS. 16, 17, and 18 illustrate a menu controlled data input system for the digital vehicle service indicator 10. These figures illustrate the digital display unit 10 which is enhanced with flat digital touch screen technology. This user friendly enhancement includes all features previously disclosed and includes menus to display, edit, and create new service indicators. To utilize each function contained therein, the user simply presses his/her finger to the screen over the appropriate menu.

FIG. 16 is a front view of the main menu of the digital vehicle service indicator of the present invention that includes touch-screen technology. The main menu 97 has menu options to display the current service settings 98, program new service settings 100, edit the current service settings 102, and a help menu 104. A user can display the current service settings by using his/her hand 94 to contact the touch screen within the box labeled "display the current service settings" 98. A user can program service options by using his/her hand 94 to contact the touch screen within the box labeled "program new service settings" 100. A user can edit the current service settings by using his/her hand 94 to contact the touch screen within the box labeled "edit the current service settings" 102. If a user needs help using any feature included within the digital vehicle service indicator, the user can use his/her hand 94 to contact the touch screen within the box labeled "help" 104. Contact of the touch screen at a desired location will cause the microprocessor 70 to alter the display and provide the desired information to the user.

FIG. 17 is a front view of the display menu of the digital vehicle service indicator of the present invention that includes touch-screen technology. This screen is shown to a user when the user, using his/her hand 94 contacts the touch screen within the box labeled "display current service settings" 100. This screen shows all the current service tasks in memory. Each service task in memory is shown within a respective programmable service task display 105, 114, 116. Each program service task display contains a digital step down odometer 108, a delete option 110, and an edit option 112. When more than one service indicator is in memory, the services are sorted numerically in the order that the service is due. Accordingly, the service with the least mileage remaining until service is due is presented on top of the list. When a user needs to update the information for a stored task, he/she would to contact the touch screen within the box labeled with the edit option 112 on the programmable service task display 105. If the user no longer wishes to store information for a specific task, then he/she would touch the delete option. When the step down odometer 108 reaches zero, at least one of an audio and visual alarm is activated to alert the user to perform the service task.

FIG. 18 is a front view of the main menu of the digital vehicle service indicator of the present invention that includes touch-screen technology. FIG. 18 illustrates a menu by which a user customizes the digital vehicle service indicator. This menu appears when the user touches the edit current settings 102 option, the program new service settings option 100, or by touching the edit option included within the programmed service settings display box. This screen includes an alphanumeric keypad 130. With the alphanumeric keypad 130, the user enters the description of the task and the desired mileage to the due date by contacting the appropriate boxes representative of the desired letters to spell the desired functions. The user can move between the service description and mileage by touching the "next" option. When the service task entry is complete, the user touches the "log entry" option 132 to store the task into memory and create a service history for the vehicle. Also included on this screen is an option to get back to the main menu after the user selectively determines the service task and mileage therefore.

Figure 19:
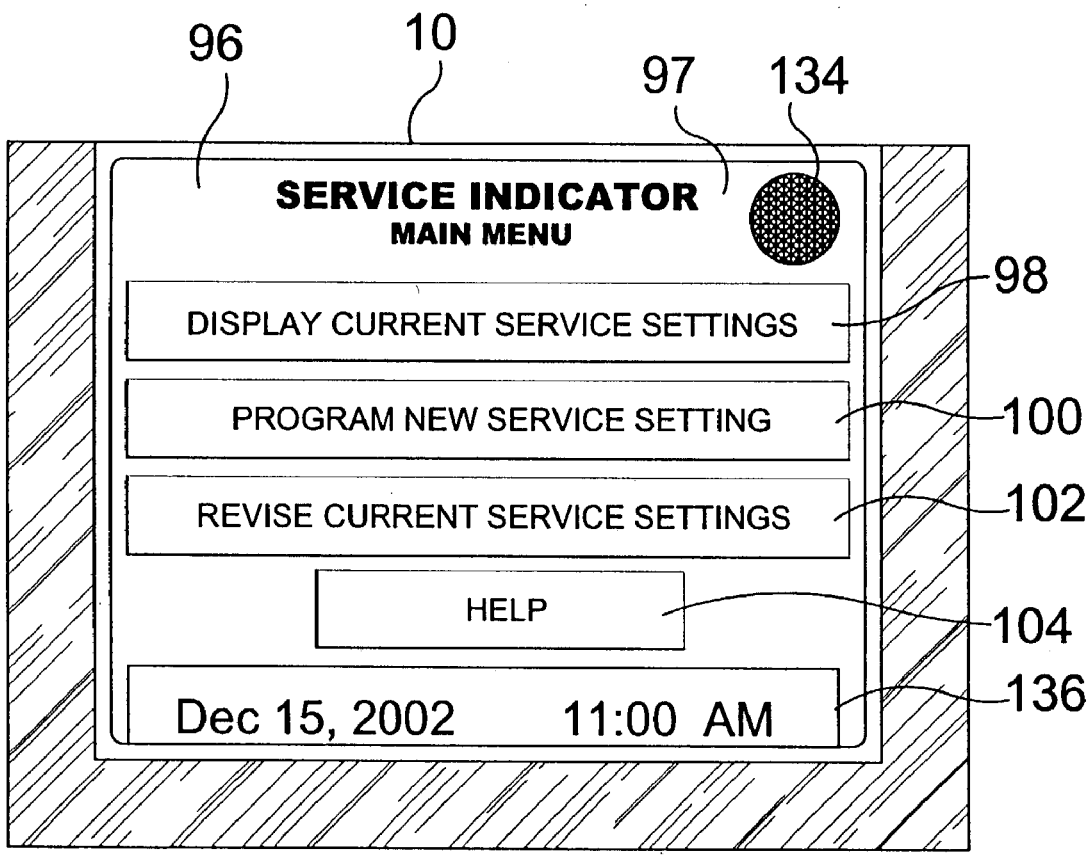
FIG. 19 is a front view of the digital vehicle service indicator of the present invention incorporating a microphone.

FIG. 19 is a front view of the main menu of the digital vehicle service indicator of the present invention that includes speech recognition technology. The main menu 97 has menu options to display the current service settings 98, program new service settings 100, edit the current service settings 102, and a help menu 104. Using microphone 134 a user speaks a key word associated with each of the screen option which loads additional screens with further options. As an example, a user speaks "Display Current Service Tasks" and the microphone 134 communicates with microprocessor 70 which display the current service tasks. Speaking "Program New Service Task" brings up a blank service task menu where the user specifies the new service task and related information such as time and date or mileage to next service. Speaking "Help" brings up a help menu that displays the current help topics. The microphone provides means whereby a user can manage the tasks of the digital vehicle service indicator 10 verbally. Speaking "Revise current Service Tasks" 102 cause microprocessor 70 to display a list of service tasks or optionally the user can verbally specify a specific task to revise whereupon microprocessor 70 will display the appropriate task data.

Figure 20:
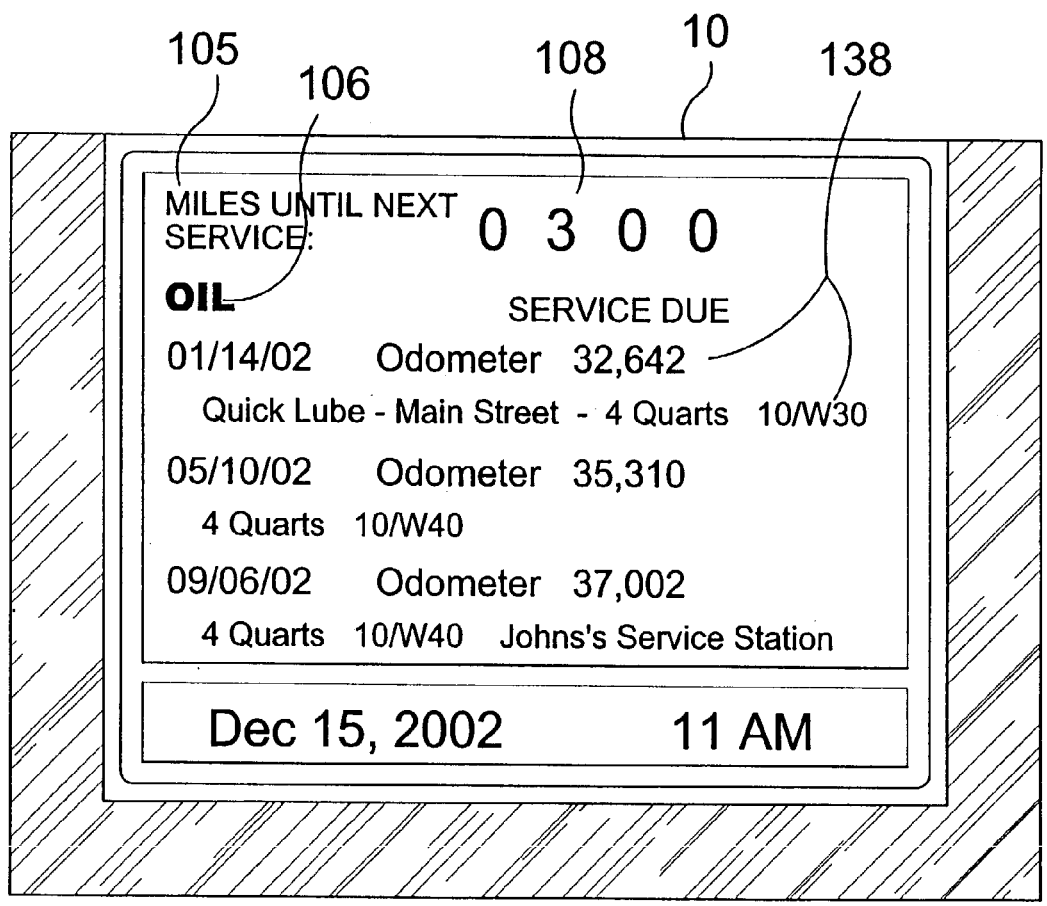
FIG. 20 is a front view of the digital vehicle service indicator for a specified service task having historical data.

FIG. 20 shows a typical service task display menu 105 for service task 106. This screen is shown to a user when the user speaks "Revise Service Task—Oil Change" the microprocessor 70 retrieves all service data related to oil change and display the data, service task 106, miles to next service or date to next service 108 and any historical data 138 verbally transcribed by the user. Each service task can be retrieved from memory either sequentially through the use of such key words as 'next' and 'previous' or directly displayed by naming the service task 106. Each programmed service task display distance or time to next service 108 and historical data recorded by the user. To update or change the displayed information a user would speak a key word followed by the data. If the user wanted to delete the information they would speak the appropriate keyword and specify the delete option which may require a confirmation to delete information.

Figure 21:
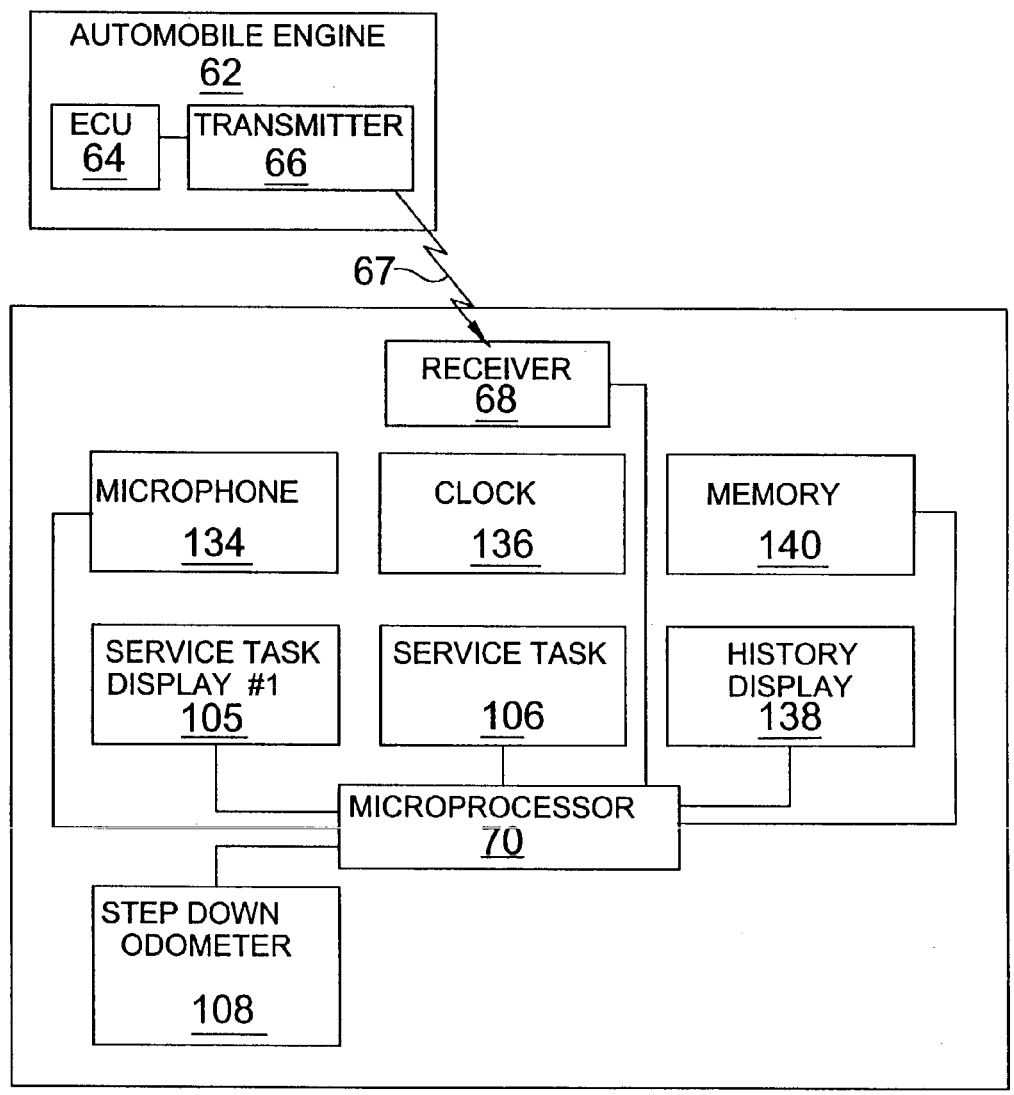
FIG. 21 is a block diagram of the digital vehicle service indicator of the present invention having a clock and microphone.

FIG. 21 is a block diagram of the alternative embodiment of the digital vehicle service indicator 10 of the present invention incorporating speech recognition. The digital vehicle service indicator 10 is controlled by a set of keywords stored in microprocessor 70 or accessible to microprocessor from memory 138 using microphone 134. For ease of discussion, the functionality of the digital display unit 10 will only be discussed in reference to a first programmable service task display 105 and the first step down odometer 108. The user speaks a pre-determined keyword or combination of key words whereby microprocessor 70 determines and retrieves the appropriate data. The microprocessor 70 includes a memory unit 140 which is able to store certain functions that may be monitored. Speaking predetermined keywords can toggle between different tasks. Upon display of the desired task the user has the option to add, change, edit, or delete any of the task displayed information 138. Each individual service task display and its respective odometer are set in the same manner described above.

The vehicle engine 62 engine control unit controls the necessary automotive operations including the number of miles the vehicle has traveled. This information is communicated via transmitter 66 to receiver 68 of the digital display unit 10. The receiver 68 communicates with the microprocessor 70 and sends a signal indicative of the number of miles traveled thereto which can be used to either determine that a service task is due or can be used by the user in creating a service task or creating an historical entry 138 for a predetermined service task 106.

The operation of the digital vehicle service indicator 10 will now be described with reference to the figures. In operation, the digital vehicle service indicator 10 is programmed prior to positioning at a desired position within a vehicle. If the digital vehicle service indicator 10 is installed in the vehicle at the factory and preprogrammed with specific factory set functions, the programming of the digital vehicle service indicator 10 is not needed.

Each service task display and step-down odometer are programmed individually and in the same manner. Thus, only programming of a first programmable service task display and step down odometer will be described. In order to program the programmable service task display 28 and the first step down odometer 12, the user depresses a pre-determined combination of key strokes using the first mode toggle button 30 and the first set button 32 of the service task display 28. Activation of the mode toggle button 30 causes a function programmed within the microprocessor 70 to be displayed on the service task display. The microprocessor 70 includes a memory unit which is able to store certain functions which may be monitored. Each activation of the mode toggle button 30 causes the microprocessor 70 to display a different function on the service task display 28. Upon display of the desired function, the user activates the set button 32 to set the function to be monitored by the service task display. The microprocessor 70 also communicates with the first step down odometer 12 and displays the number of miles selected by the user until the service task need be performed. The number of miles is set by activation of a toggle and set button on the odometer in the same manner as described above regarding the service task display. Each individual service task display and its respective odometer are set in the same manner described above.

Once each individual service task display and its respective odometer are set, the display is inserted in the slide retainer bracket 16. The slide retainer bracket is then secured to the universal mounting bracket 56. The universal mounting bracket is then releasably secured in a desired position within the vehicle.

Upon starting up the vehicle and traveling a distance, the engine control unit 64 controls the necessary automotive operations and monitors the operations being controlled. For our purpose here, the relevant operation controlled by the engine control unit 64 is the number of miles the vehicle has traveled. The engine control unit 64 is able to monitor the rotation of the wheels of the vehicle and thus determine the distance traveled by the vehicle. At predetermined intervals, such that are known in the art, the engine control unit 64 communicates with a transmitter 66, which remotely transmits the number of miles traveled by the vehicle to a receiver 68 of the digital display unit 10. The receiver 68 is connected to the microprocessor 70 and sends a signal indicative of the number of miles traveled thereto. The microprocessor 70 then communicates with the first step down odometer 12 and reduces the number displayed on the first step down odometer by the number of miles traveled by the vehicle. This process continues until the value displayed by the step down odometer 12 reaches zero. The microprocessor 70 then causes the first indicator light 34 to be illuminated thereby alerting the user that the service task displayed on the programmable service task display 28 needs to be performed. The microprocessor 70 controls the functions of the second and third step down odometers 38, 48 and second and third programmed service displays 36, 46 in the same manner as described above. An audible alarm may also be connected to the microprocessor and controlled to produce an audible signal when a respective odometer reaches a value of zero. A different audible sound may be generated by the microprocessor for each function being monitored thereby distinguishing between the type of service needed.

Optionally, the audible and visual alarms and reminders that could be set at various intervals. For example, an audible alarm and an LED may be programmed to be activated every 100 miles measured once the vehicle is within 1000 miles of a required service and every 10 miles once the respective odometer of the unit reaches the 0000 mark. Since the present invention is already in communication with the ECU and capable of translating the standardized communication protocol, the device may also be programmed to inform the driver of immediate conditions such as electrical problems, high temperature, low oil pressure, etc. through the use of digital text messages and any combination including LED's and audible alarms.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A vehicle service indicator releasably secured within a vehicle, said vehicle service indicator comprising;
   a) a flat member containing a microprocessor to monitor a distance traveled by the vehicle;
   b) a programmed service task indicator controlled by the microprocessor and having a display on a front face of said flat member indicating a desired function to be monitored;
   c) a step down odometer connected to the microprocessor, said step down odometer including a display on said front face for displaying a numeric value indicative of a distance to be traveled by the vehicle before the function displayed by the programmed service indicator is to be performed;
   d) said microprocessor decreasing the value displayed by said step down odometer relative to the monitored distance traveled by the vehicle and upon the value displayed by said step down odometer reaching a value of "0" said microprocessor activating an alarm signal alerting a user of the vehicle that the function displayed by the programmed service indicator should be performed; and
   e) a U-shaped universal mounting bracket having two channels for receiving said flat member, a slide retainer bracket mounted on a bottom of said mounting bracket for securing said flat member within said channels, and an arm extending from said slide retainer bracket, a free end of said arm having a mounting pad for mounting said indicator to a desired position within the vehicle.

2. The vehicle service indicator as recited in claim 1, further comprising a plurality of programmed service task indicators and a plurality of step down odometers, each of said plurality of programmed service task indicators being associated with a respective one of said plurality of step down odometers for monitoring a respective function for the vehicle.

3. The vehicle service indicator as recited in claim 2 in which said vehicle includes an engine having an engine control unit and a transmitter for receiving from said engine control unit a number of miles traveled by said vehicle and transmitting wirelessly said number of miles, said vehicle service indicator including a receiver for receiving and transferring said number of miles to said microprocessor.

4. The vehicle service indicator as recited in claim 1, wherein said step down indicator provides a digital display.

5. The digital vehicle service indicator as recited in claim 3, in which said indicator is mounted on an inside surface of a front windshield of said vehicle, a rear surface of said flat member being lined with solar panels to provide power for said indicator.

6. The vehicle service indicator as recited in claim 3, having a wireless programming port for programming said indicator.

7. The vehicle service indicator as recited in claim 3, in which said front surface of said flat member is a touch screen, said microprocessor generating a menu to be displayed by said touch screen for programming the function to be monitored and the value to be displayed by said step down odometers.

8. The vehicle service indicator as recited in claim 3, further comprising a function toggle button and a function set button for use in programming said microprocessor with a desired function to be monitored.

9. The vehicle service indicator as recited in claim 8, further comprising a distance toggle button and a distance set button for use in programming said microprocessor with a desired initial value for display by said odometer.

* * * * *